United States Patent
Adhya et al.

(10) Patent No.: US 9,009,327 B2
(45) Date of Patent: Apr. 14, 2015

(54) SYSTEMS AND METHODS FOR PROVIDING IIP ADDRESS STICKINESS IN AN SSL VPN SESSION FAILOVER ENVIRONMENT

(75) Inventors: Saibal Adhya, Bangalore (IN); Akshat Choudhary, Bangalore (IN); Shashi Nanjundaswamy, Bangalore (IN); Sergey Verzunov, Moscow (RU); Arkesh Kumar, Santa Clara, CA (US); Amarnath Mullick, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 1620 days.

(21) Appl. No.: 11/833,581

(22) Filed: Aug. 3, 2007

(65) Prior Publication Data
US 2009/0037763 A1    Feb. 5, 2009

(51) Int. Cl.
| | |
|---|---|
| G06F 15/16 | (2006.01) |
| H04L 12/46 | (2006.01) |
| H04L 29/12 | (2006.01) |
| H04L 29/08 | (2006.01) |
| H04L 29/14 | (2006.01) |
| G06F 15/173 | (2006.01) |
| H04W 4/00 | (2009.01) |
| H04L 29/06 | (2006.01) |

(52) U.S. Cl.
CPC ...... H04L 12/4641 (2013.01); H04L 29/12216 (2013.01); H04L 61/2007 (2013.01); H04L 63/0272 (2013.01); H04L 63/166 (2013.01); H04L 67/14 (2013.01); H04L 69/40 (2013.01)

(58) Field of Classification Search
USPC .......................... 709/227, 224, 239; 370/338
See application file for complete search history.

(56) References Cited

U.S. PATENT DOCUMENTS

| | | |
|---|---|---|
| 5,870,744 A | 2/1999 | Sprague |
| 6,308,273 B1 | 10/2001 | Goertzel et al. |
| 6,438,127 B1 | 8/2002 | Le Goff et al. |
| 6,631,416 B2 | 10/2003 | Bendinelli et al. |
| 6,832,322 B1 | 12/2004 | Boden et al. |
| 6,912,582 B2 | 6/2005 | Guo et al. |

(Continued)

OTHER PUBLICATIONS

Office Action for U.S. Appl. No. 11/465,963 dated Jan. 26, 2009.

(Continued)

*Primary Examiner* — Melanie Jagannathan
*Assistant Examiner* — Stephanie Chang
(74) *Attorney, Agent, or Firm* — Foley & Lardner LLP; Christopher J. McKenna; Paul M. H. Pua

(57) ABSTRACT

The SSL VPN session failover solution of the appliance and/or client agent described herein provides an environment for handling IP address assignment and end point re-authorization upon failover. The appliances may be deployed to provide a session failover environment in which a second appliance is a backup to a first appliance when a failover condition is detected, such as failure in operation of the first appliance. The backup appliance takes over responsibility for SSL VPN sessions provided by the first appliance. In the failover environment, the first appliance propagates SSL VPN session information including user IP address assignment and end point authorization information to the backup appliance. The backup appliance maintains this information. Upon detection of failover of the first appliance, the backup appliance activates the transferred SSL VPN session and maintains the user assigned IP addresses. The backup appliance may also re-authorize the client for the transferred SSL VPN session.

22 Claims, 18 Drawing Sheets

(56) References Cited

U.S. PATENT DOCUMENTS

| | | |
|---|---|---|
| 6,970,471 B1 | 11/2005 | Yeh et al. |
| 7,171,473 B1 | 1/2007 | Eftis et al. |
| 7,546,628 B2 | 6/2009 | Tsang et al. |
| 8,451,806 B2 * | 5/2013 | Kumar et al. ............... 370/338 |
| 2002/0103931 A1 | 8/2002 | Mott |
| 2003/0041167 A1 | 2/2003 | French et al. |
| 2003/0065763 A1 | 4/2003 | Swildens et al. |
| 2003/0088698 A1 * | 5/2003 | Singh et al. ............... 709/239 |
| 2003/0177389 A1 | 9/2003 | Albert et al. |
| 2003/0191848 A1 | 10/2003 | Hesselink et al. |
| 2004/0218611 A1 | 11/2004 | Kim |
| 2004/0268121 A1 | 12/2004 | Shelest et al. |
| 2005/0033858 A1 | 2/2005 | Swildens et al. |
| 2006/0236095 A1 * | 10/2006 | Smith et al. ............... 713/153 |
| 2007/0245409 A1 | 10/2007 | Harris et al. |

OTHER PUBLICATIONS

Office Action for U.S. Appl. No. 11/465,963 dated Aug. 20, 2009.
Office Action for U.S. Appl. No. 11/465,980 dated Aug. 21, 2009.
Office Action for U.S. Appl. No. 11/465,958 dated Jun. 10, 2009.
Office Action for U.S. Appl. No. 11/465,980 dated Jan. 26, 2010.
Office Action for U.S. Appl. No. 11/465,958 dated Jan. 7, 2010.
Office Action for U.S. Appl. No. 11/465,963 dated Dec. 8, 2009.
Advisory Action for U.S. Appl. No. 11/465,980 dated Apr. 15, 2010.

* cited by examiner

Example 1:

Primary 200                           Secondary 200'

T1: User u1 picks up an IIP.          T1: Propagated.

T2: session gets deleted.             T2: Propagation Failed

T3: User u1 again logs in and got the same IIP.   T3: Propagated.

Example 2:

Primary 200                           Secondary 200'

T1: User u1 picks up an IIP.          T1: Propagated.

T2: Use u1 logs out.                  T2: Propagation Failed

T3: User u2 reclaims the IIP.         T3: Propagated.
                                      In secondary u2 is using the IIP.

FIG. 10B

SYSTEMS AND METHODS FOR PROVIDING IIP ADDRESS STICKINESS IN AN SSL VPN SESSION FAILOVER ENVIRONMENT

FIELD OF THE INVENTION

The present invention generally relates to data communication networks and, in particular, to systems and methods for performing SSL VPN session failover.

BACKGROUND OF THE INVENTION

A typical computer system uses a single internet protocol (IP) address assigned to the computer system. Any user session or program on the computer will use the IP address of the computer for network communications on a TCP/IP network. Communications over the network to and from the computer, for example between a client and a server, use the computer's IP address as part of the network communications of the computer. In a virtual private network environment, a remote user may establish a virtual private network connection from a client to a second network, such as via an SSL VPN connection from a client on a public network to a server on a private network. On the second network, a second IP address is used for communications between the client and the server.

A user of the virtual private network may log in via the same computing device or roam between computing devices. For each login session, a different second IP address may be used for virtual private network communications. Also, for each computing device of the user, a different second IP address may be used for virtual private network communications. As such, the user and/or computing device of the user may be associated with different IP addresses on the virtual private network at various times. In some cases, the user may have multiple virtual private network sessions concurrently, and thus, multiple IP addresses on the private network. Identifying, tracking or managing the virtual private network addresses of remote users is challenging, and may be compounded in an environment with a multitude of remote virtual private network users.

One challenge with assigning IP addresses for users of a virtual private network is handling failures with devices providing the IP address. A first device, such as a gateway, may assign the user a first IP address for use on a private network. The first device may experience a failure. The user may need to gain access to the private network via a second device, such as a second gateway. This second device may assign the user a second IP address for use on the private network. This may cause problems in communications with the private network as the client, applications and/or a server may expect the user to be using the first IP address.

Another challenge with failovers in a virtual private network environment is security. A gateway device providing VPN connectivity may authorize a client to access the network. The gateway may check if the client device has attributes meeting one or more conditions for accessing the network. For example, the gateway may check if the client has security software installed or the appropriate operating system patch. Upon authorization, a user may access the private network via the gateway such as via a SSL VPN session. At some point, the gateway may fail or operation may be interrupted. The client may re-establish the SSL VPN session with the network. However, the attributes of the client upon which the client was authorized may have changed since establishing the session. For example, security software or operating system patches on the device may have been installed or removed. This may leave the network vulnerable to these changes when re-establishing sessions with previously authorized clients.

BRIEF SUMMARY OF THE INVENTION

The SSL VPN session failover solution of the appliance and/or client agent described herein provides an environment for handling IP address assignment and end point re-authorization upon failover. The appliances may be deployed to provide a session failover environment in which a second appliance is a backup to a first appliance when a failover condition is detected, such as failure in operation of the first appliance. The backup appliance takes over responsibility for SSL VPN sessions provided by the first appliance. In a failover environment, the first appliance propagates SSL VPN session information including user IP address assignment and end point authorization information to the backup appliance. The backup appliance maintains this information. Upon detection of failover of the first appliance, the backup appliance activates the transferred SSL VPN session and maintains the user assigned IP addresses. The backup appliance may also re-authorize the client for the transferred SSL VPN session.

In one case, the appliance provides techniques and policies for assigning previously assigned virtual private network addresses, referred to as Intranet IP (IIP) addresses, of a user to subsequent sessions of the user as the user logs in multiple times or roams between access points. This technique is referred to IIP stickiness as the appliance attempts to provide the same IIP address to a reconnecting VPN user. In the case of appliance failover, in which a backup appliance takes over responsibility for a user's SSL VPN session, the appliances provide seamless IIP address stickiness for the user as the SSL VPN session is transferred to the backup appliance. The user continues his or her SSL VPN session with the backup appliance using one of the previously assigned IIP addresses of the user.

In another case, the appliance provides for end point detection and re-authorization of the client upon transfer of a user's SSL VPN session from a first appliance to a backup appliance. The appliance provides techniques for performing end point detection and authorization using policy-based client security strings to determine attributes of the client device. Depending on the values and evaluation of these client security strings, the appliance may authorize the client to access the virtual private network in accordance with one or more policies. An authorized client may establish an SSL VPN session with the first appliance. The first appliance may experience a failover condition and the SSL VPN session is transferred to a backup appliance. Although the client was authorized by the first appliance for the SSL VPN session, the backup appliance performs end point detection and re-authorization client for the transferred SSL VPN session using the client security string.

In some aspects the present invention relates to a system and method of maintaining a user's intranet internet protocol address upon failover of a client's secure socket layer virtual private network (SSL VPN) session from a first appliance to a second appliance. A second appliance receives information from a first appliance. The information identifies one or more intranet internet protocol (IIP) addresses assigned to a first user for accessing a network via a first secure socket layer virtual private network (SSL VPN) session provided by the first appliance. The second appliance detects the first appliance is unavailable to provide the first SSL VPN session to the network The second appliance receives a request from the client operated by the first user to establish a second SSL VPN session with the network. The second appliance assigns to the client a first intranet internet protocol address previously assigned to the first user from the one or more intranet internet protocol addresses as an internet protocol address on the network.

In one embodiment, the second appliance provides SSL VPN connectivity to the network in response to the detection. In another embodiment, the second appliance assigns a least recently or a most recently used intranet internet protocol address of the one or more intranet internet protocol addresses as the first intranet internet protocol address. In some embodiments, the second appliance assigns a least used or a most used intranet internet protocol address of the one or more intranet internet protocol addresses as the first intranet internet protocol address. In another embodiment, the second appliance assigns the first intranet internet protocol address from the one or more intranet internet protocol addresses responsive to a policy of a policy engine.

In other embodiments, the second appliance determines an inactive intranet internet protocol address from the plurality of intranet internet protocol addresses as the first intranet internet protocol address. In one embodiment, the second appliance identifies a policy specifying a domain name suffix to append to an identifier of the user to provide a user domain name. In some embodiments, the second appliance associates the user domain name with the first intranet internet protocol address.

In some embodiments, the second appliance receives one or more client-side attributes of the client, such as via end point detection. For example, the second appliance may transmit a request to the client to evaluate at least one clause of a security string. The clause may include an expression associated with a client-side attribute. The second appliance may receive a result of the client's evaluation of the at least one clause. The second appliance assigns the client to an authorization group based on the one or more client-side attributes.

In other aspects, the present invention relates to a system and method of performing authorization of a client's secure socket layer virtual private network (SSL VPN) session transferred upon failover from a first appliance to a second appliance. The second appliance receives from the first appliance, information identifying a security string used by the first appliance to authorize a secure socket layer virtual private network (SSL VPN) session established between a client and a network. The second appliance detects the first appliance is unavailable to continue the SSL VPN session. The second appliance provides the SSL VPN session for the client in response to the detection. The second appliance places the SSL VPN session on hold until the client is authorized by the second appliance. The t second appliance transmits a request to the client to evaluate at least one clause of the security string. The at least one clause includes an expression identifying a client-side attribute.

In one embodiment, the second appliance activates the on hold SSL VPN session upon receiving a predetermined result from evaluation of the least one clause of the security string. In another embodiment, the second appliance assigns the client to an authorization group based on a result from evaluation of the at least one clause. In some embodiments, the second appliance transmits the request to a collection agent on the client. The collection agent gathers information associated with the client-side attribute and evaluates the at least one clause. In other embodiments, the second appliance receives from the client in response to the request a result from evaluation of the at least one clause providing the client-side attribute.

The client side attribute may indicate a presence on the client of any of the following: a version of an operating system, a service pack of the operating system, a running service, a running process, and a file. The client-side attribute may also indicate a presence on the client of any one or more of the following: antivirus software, personal firewall software, anti-spam software, and internet security software.

In some embodiments, the second appliance, responsive to a result from evaluation of the at least one clause, determines that the client lacks a desired client-side attribute. In response to the determination the second appliance may maintain the SSL VPN session on hold. The second appliance may determining from a result from evaluation of the at least one clause that the client-side attribute is not set to a value in accordance with a policy. The second appliance may continue to keep the SSL VPN session on hold in response to the determination.

In another embodiment, the second appliance assigns the client to an authorization group providing quarantined access to the network in response to a result from evaluation of the at least one clause. The second appliance then may activate the SSL VPN session. In other embodiments, the second appliance assigns the client to an authorization group responsive to an application of a policy by a policy engine to a result from evaluation of the at least one clause, and then may activate the SSL VPN session.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIG. 10B is a diagram depicting example embodiments of user scenarios of maintaining IIP address information via session failover.

Figure 1A:
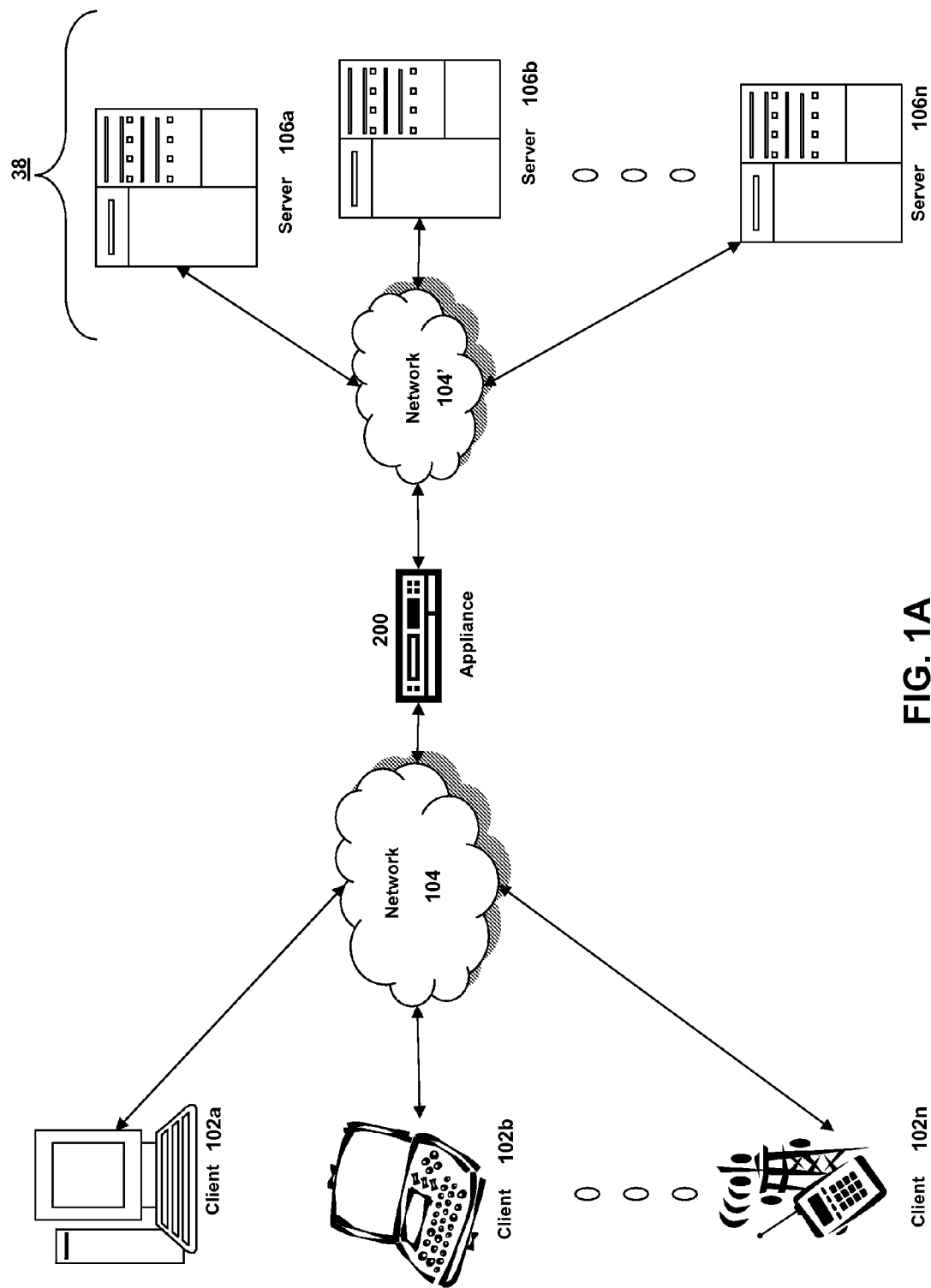
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments of the present invention below, the following descriptions of the sections of the specification and their respective contents may be helpful:

Section A describes a network environment and computing environment useful for practicing an embodiment of the present invention;

Section B describes embodiments of a system and appliance architecture for accelerating delivery of a computing environment to a remote user;

Section C describes embodiments of a client agent for accelerating communications between a client and a server;

Section D describes embodiments of an appliance environment for managing Intranet Internet Protocol (IIP) addresses;

Section E describes embodiments of systems and methods for maintaining Intranet Internet Protocol (IIP) address "stickiness" to a user;

Section F describes embodiments of systems and methods for end point detection and authorization using client security strings;

Section G describes embodiments of an environment for SSL VPN session failover via appliances;

Section H describes embodiments of systems and methods for maintaining Intranet Internet Protocol (IIP) addresses upon SSL VPN session failover; and Section I describes embodiments of systems and methods for end point reauthorization upon SSL VPN session failover.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In one embodiment, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In one embodiment, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In one embodiment, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In one embodiment, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In one embodiment, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In one embodiment, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In one embodiment, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In one embodiment, the client 102 communicates directly with the server 106 to access the identified application. In another embodiment, the client 102 receives application output data, such as display data, generated by an execution of the identified application on the server 106.

Figure 1B:
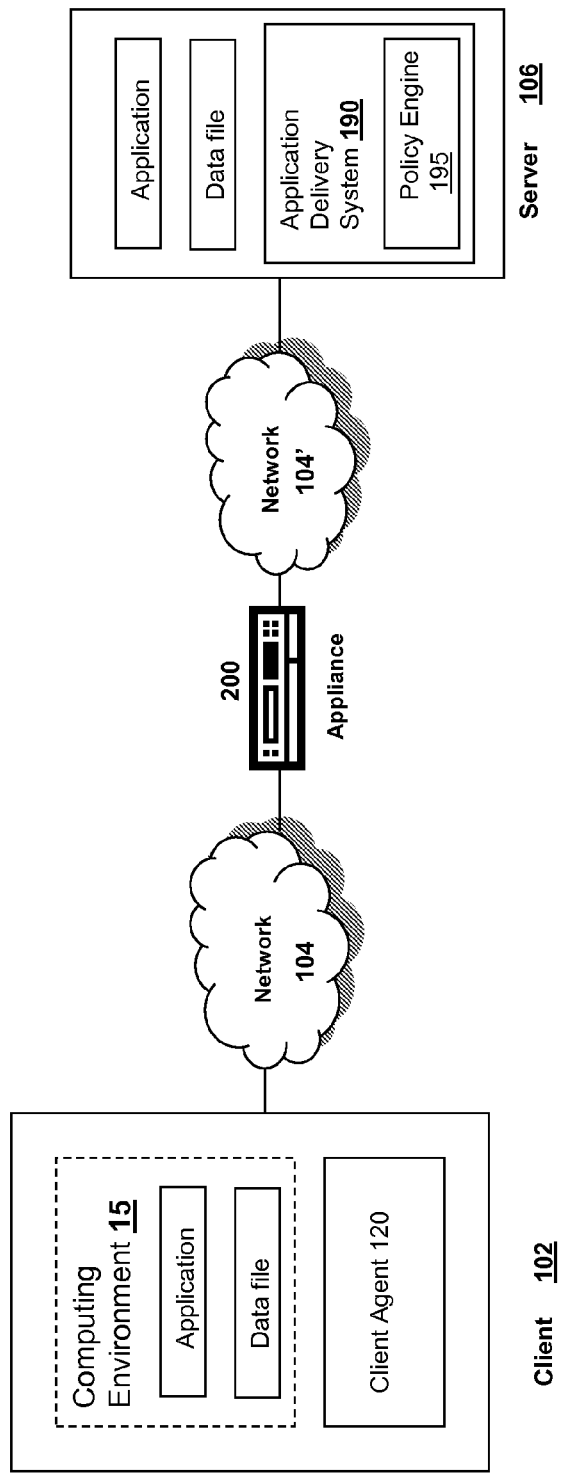
FIG. 1B is a block diagram of an embodiment of an environment for delivering a computing environment from a server to a client via an appliance.

Referring now to FIG. 1B, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In one embodiment, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In one embodiment, the application delivery system 190 may reside or execute on a server 106. In another embodiment, the application delivery system 190 may reside or execute on a plurality of servers 106a-106n. In some embodiments, the application delivery system 190 may execute in a server farm 38. In one embodiment, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In one embodiment, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, in one embodiment, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In one embodiment, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In one embodiment, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In one embodiment, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In one embodiment, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Figure 1C:
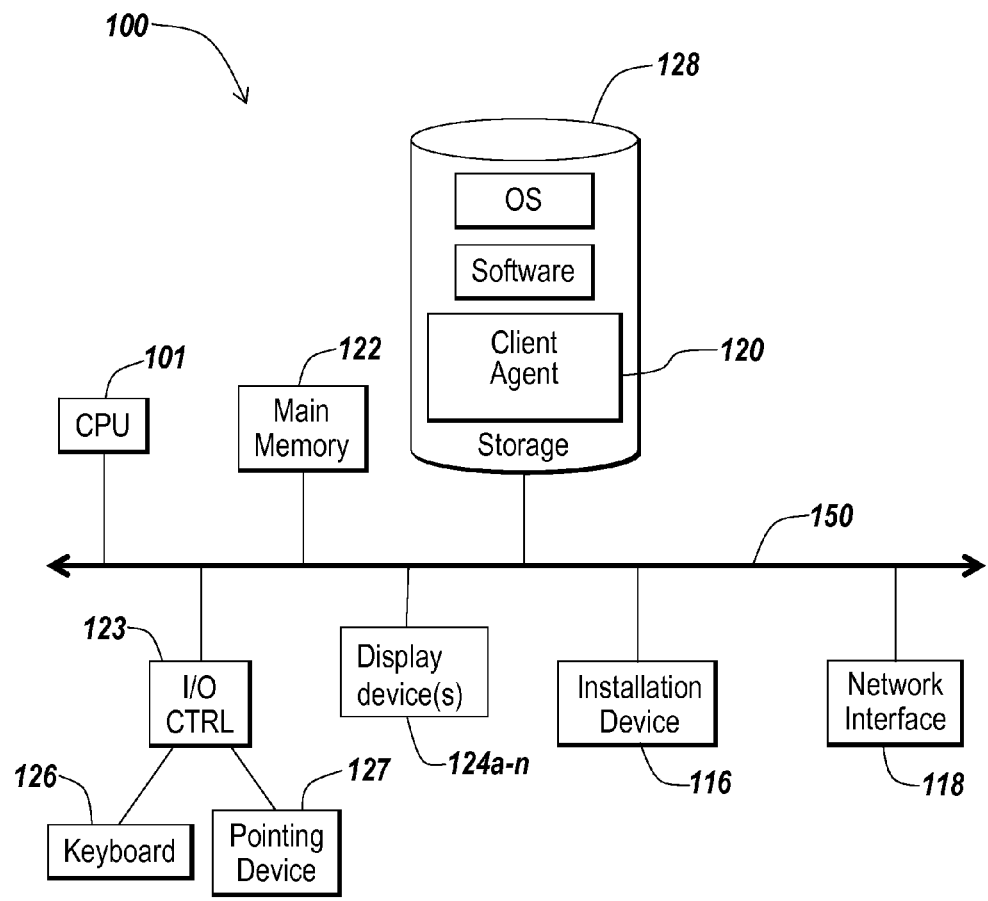
FIGS. 1C and 1D are block diagrams of embodiments of a computing device.
Figure 1D:
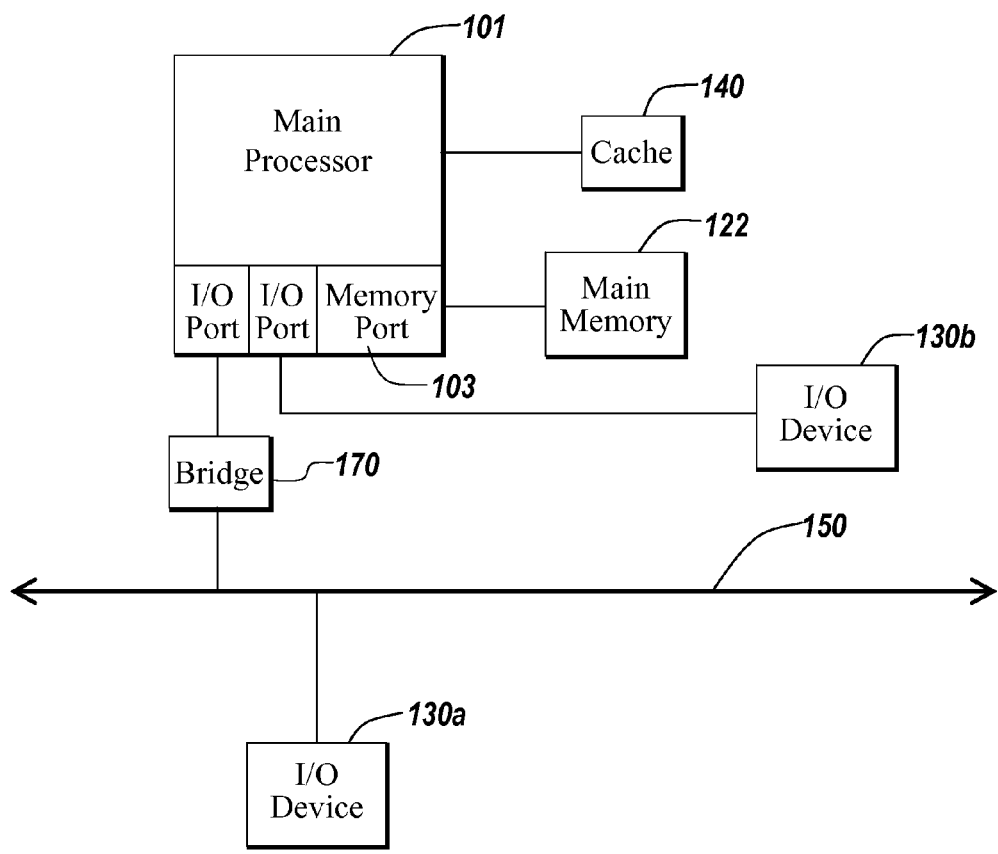

The client 102, server 106, and appliance 200 may be deployed as and/or executed on any type and form of computing device, such as a computer, network device or appliance capable of communicating on any type and form of network and performing the operations described herein. FIGS. 1C and 1D depict block diagrams of a computing device 100 useful for practicing an embodiment of the client 102, server 106 or appliance 200. As shown in FIGS. 1C and 1D, each computing device 100 includes a central processing unit 101, and a main memory unit 122. As shown in FIG. 1C, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1C, the processor 101 communicates with main memory 122 via a system bus 150 (described in more detail below). FIG. 1C depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1C, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1D depicts an embodiment of a computer 100 in which the main processor 101 communicates directly with I/O device 130 via HyperTransport, Rapid I/O, or InfiniBand. FIG. 1D also depicts an embodiment in which local busses and direct communication are mixed: the processor 101 communicates with I/O device 130 using a local interconnect bus while communicating with I/O device 130 directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1C. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1C and 1D typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, California; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

B. Appliance Architecture

Figure 2A:
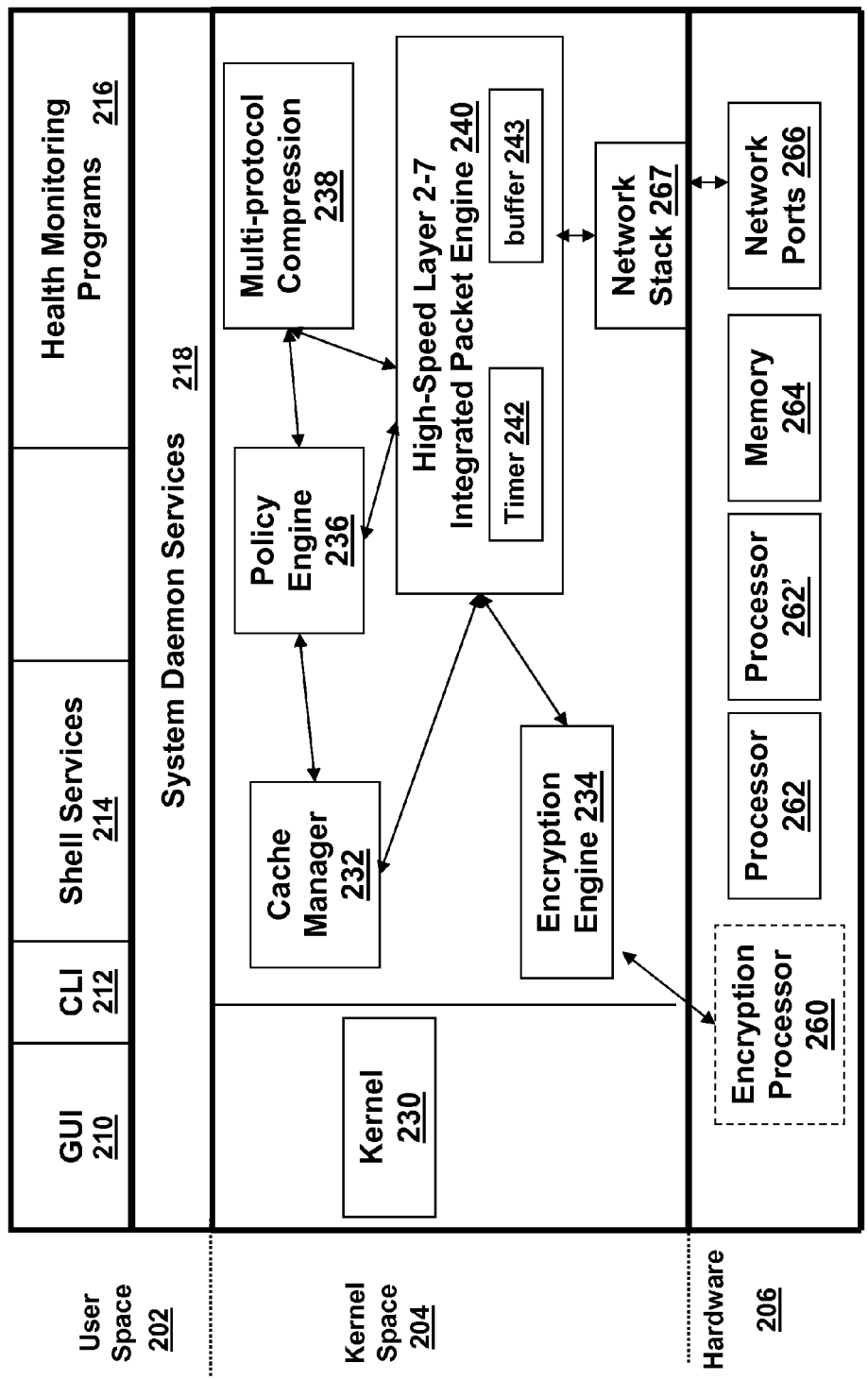
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1C and 1D. In some embodiments, the central processing unit 262 may perform the functions of the encryption processor 260 in a single processor. Additionally, the hardware layer 206 may comprise multiple processors for each of the processing unit 262 and the encryption processor 260. For example, in one embodiment, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may be have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1C and 1D. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232. sometimes also referred to as the integrated cache, the benefits of which are described in detail further herein. Additionally, the embodiment of the kernel 230 will depend on the embodiment of the operating system installed, configured, or otherwise used by the device 200.

In one embodiment, the device 200 comprises one network stack 267, such as a TCP/IP based stack, for communicating with the client 102 and/or the server 106. In one embodiment, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and 267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In one embodiment, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In one embodiment, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In one embodiment, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element nat comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In one embodiment, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In one embodiment, the policy engine 236 provides a configuration mechanism to allow a user to identifying, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In one embodiment, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In one embodiment, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In one embodiment, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In one embodiment, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, in one embodiment, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200 and either is user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
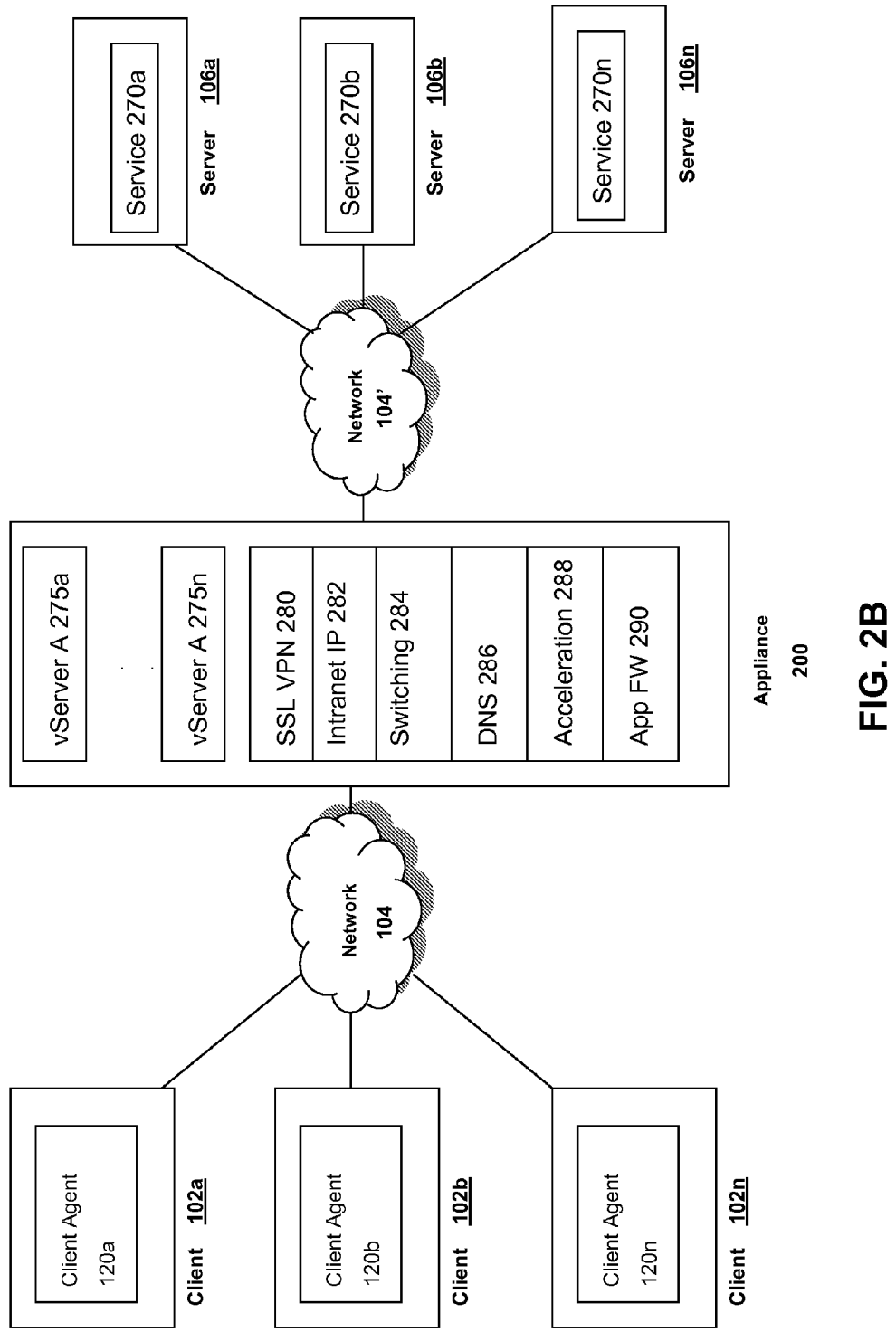
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. In one embodiment, the appliance 200 comprises any of the network devices manufactured by Citrix Systems, Inc. of Ft. Lauderdale Fla., referred to as Citrix NetScaler devices. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In one embodiment, the policies are associated with a VServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 103 In one embodiment, the appliance 102 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP (Transport Control Protocol) or UDP (User Datagram Protocol) connection with a client 102 via the client agent 120. In one embodiment, the vServer 275 listens for and receives communications from the client 102. In other embodiments, the vServer 275 establishes a transport layer connection, such as a TCP or UDP connection with a client server 106. In one embodiment, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In one embodiment, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 120, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In one embodiment, the appliance 200 hosts an intranet internet protocol or intranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP, which is a network identifier, such as IP address and/or host name, for the client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In one embodiment, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In one embodiment, although the network layer or layer 2 of the network packet identifies a destination server 106, the appliance 200 determines the server 106 to distribute the network packet by application information and data carried as payload of the transport layer packet. In one embodiment, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts' a DNS request transmitted by the client 102. In one embodiment, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In one embodiment, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 290 may take a policy action on the network communication, such as prevent transmission of the network communication. In another embodiment, the application firewall 290 may rewrite, remove or otherwise mask such identified occurrence or confidential information.

C. Client Agent

Figure 3:
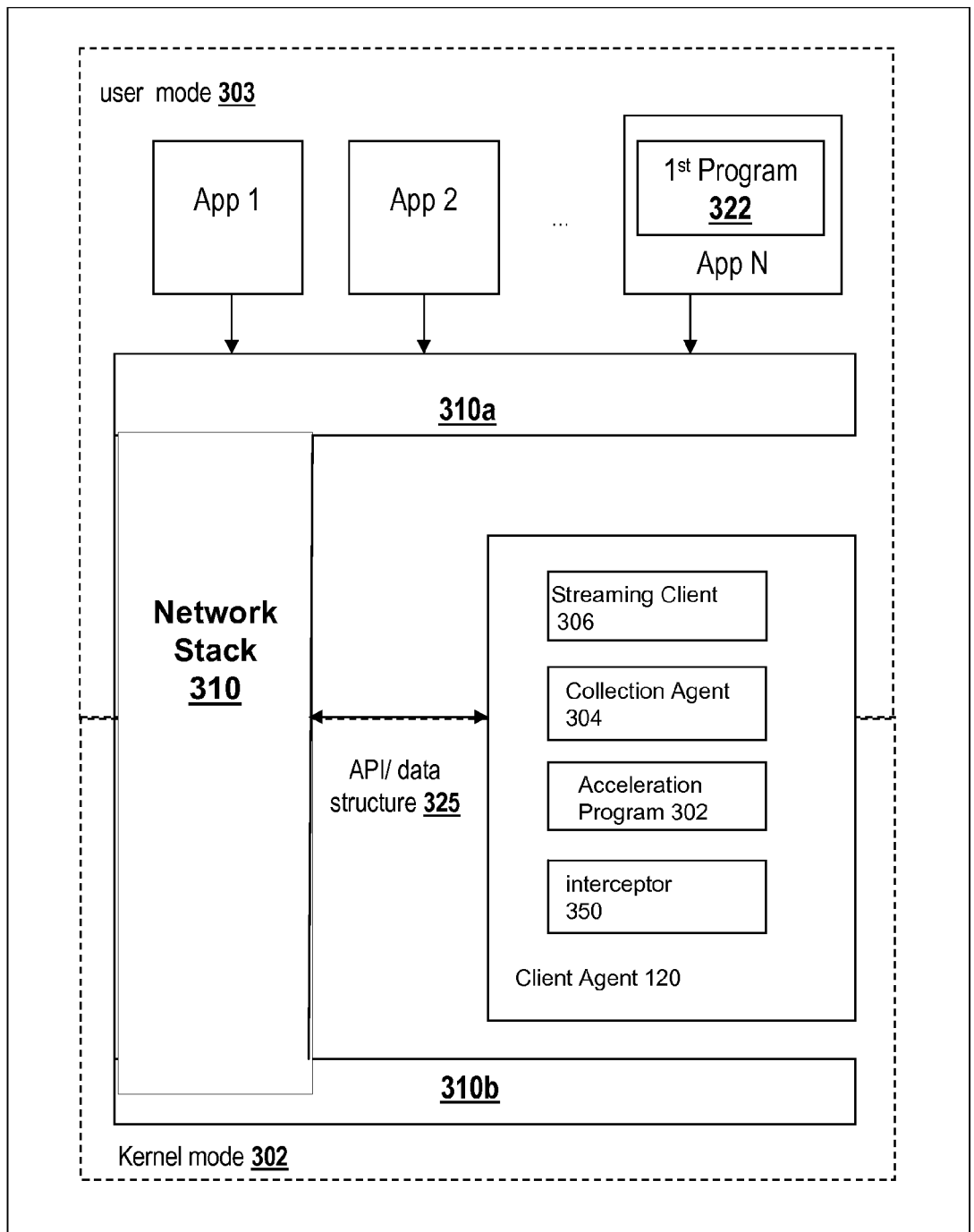
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310*a*-310*b*. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In one embodiment, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 120 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In one embodiment, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310*a* of the network stack may provide user-mode access to the network stack 310 to an application while a second portion 310*a* of the network stack 310 provides access to a network. In some embodiments, a first portion 310*a* of the network stack may comprise one or more upper layers of the network stack 310, such as any of layers 5-7. In other embodiments, a second portion 310*b* of the network stack 310 comprises one or more lower layers, such as any of layers 1-4. Each of the first portion 310*a* and second portion 310*b* of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In one embodiment, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In one embodiment, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In one embodiment, the interceptor 350 may comprise a driver complying with the Network Driver Interface Specification (NDIS), or a NDIS driver. In another embodiment, the interceptor 350 may comprise a mini-filter or a mini-port driver. In one embodiment, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In one embodiment, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In one embodiment, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In one embodiment, the client agent 120 and/or interceptor 350 resolves the DNS request. In another embodiment, the interceptor transmits the intercepted DNS request to the appliance 200 for DNS resolution. In one embodiment, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In one embodiment, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, in one embodiment, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, and/or a collection agent 304. In one embodiment, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In one embodiment, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In one embodiment, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In one embodiment, the policy engine 236 of the appliance 200 uses the collected information to determine and provide access, authentication and authorization control of the client's connection to a network 104.

In one embodiment, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments and still referring to FIG. 3, a first program 322 may be used to install and/or execute the client agent 120, or portion thereof, such as the interceptor 350, automatically, silently, transparently, or otherwise. In one embodiment, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In one embodiment, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

Communication between a program neighborhood-enabled client 102 and a server 106 or appliance 200 may occur over a dedicated virtual channel that is established on top of an ICA virtual channel. In some embodiments, the communication occurs using an XML service. In other embodiments, the client 102 runs a client-side dialog that acquires the credentials of a user of the client 102. In still other embodiments, a user management subsystem on a server 106 receiving the credentials of the user may return a set of distinguished names representing the list of accounts to which the user belongs. Upon authentication, the server 106 may establish a program neighborhood virtual channel, a control channel, or other communications channel. In yet other embodiments, an acceleration program 302 may also be transmitted to the client 102 in response to a client 102 request.

In some embodiments, a client 102 may use the client agent 120 to browse farm 38, servers 106 and applications in the farm 38. In one embodiment, each server 106 includes an ICA browsing subsystem to provide the client 102 with browsing capability. After the client 102 establishes a connection with the ICA browser subsystem of any of the servers 106, that browser subsystem supports a variety of client 102 requests. Such requests include: (1) enumerating names of servers in the farm, (2) enumerating names of applications published in the farm, (3) resolving a server name and/or application name to a server address that is useful to the client 102. The ICA browser subsystem also supports requests made by clients 102 running a program neighborhood application that provides the client 102, upon request, with a view of those applications within the farm 38 for which the user is authorized. The ICA browser subsystem forwards all of the above-mentioned client requests to the appropriate subsystem in the server 106.

In one embodiment, a user of the client 102 selects an application for execution from a received enumeration of available applications. In another embodiment, the user selects an application for execution independent of the received enumeration. In some embodiments, the user selects an application for execution by selecting a graphical representation of the application presented on the client 102 by a client agent 120. In other embodiments, the user selects an application for execution by selecting a graphical representation of the application presented to the user on a web server or other server 106. In some embodiments, an appliance 200 or acceleration program 302 accelerates delivery of the graphical representation. In some embodiments, an appliance 200 caches or stores the graphical representation. In some embodiments an appliance 200 may cache or store any and all of the associated applications or portions of the associated applications.

In some embodiments, when a client 102 connects to the network 104, the user of the client 102 provides user credentials. User credentials may include the username of a user of the client 102, the password of the user, and the domain name for which the user is authorized. Alternatively, the user credentials may be obtained from smart cards, time-based tokens, social security numbers, user passwords, personal identification (PIN) numbers, digital certificates based on symmetric key or elliptic curve cryptography, biometric characteristics of the user, or any other means by which the identification of the user of the client 102 can be obtained and submitted for authentication. The server 106 or appliance 200 responding to the client 102 can authenticate the user based on the user credentials.

In some embodiments, the client 102 provides credentials upon making a request for execution of an application to a server 106, directly or through an appliance 200. In one of these embodiments, the client 102 requests access to an application residing on a server 106. In another of these embodiments, the client 102 requests access to a network on which a desired resource resides. In other embodiments, the client 102 provides credentials upon making a request for a connection to an appliance 200. In one of these embodiments, the client 102 requests access to a virtual private network. In another of these embodiments, the client 102 requests a network address on the virtual private network. In still another of these embodiments, the client 102 initiates a connection to the appliance 200.

In some embodiments, the user provides credentials to the server 106 or appliance 200 via a graphical user interface presented to the client 102 by the server 106 or appliance 200. In other embodiments, a server 106 or appliance 200 having the functionality of a web server provides the graphical user interface to the client 102. In still other embodiments, a collection agent transmitted to the client 102 by the server 106 or appliance 200 gathers the credentials from the client 102.

In one embodiment, a credential refers to a username and password. In another embodiment, a credential is not limited to a username and password but includes, without limitation, a machine ID of the client 102, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the server 106 or appliance 200, date or time of access request including adjustments for varying time zones, and authorization credentials.

In some embodiments, a credential associated with a client 102 is associated with a user of the client 102. In one of these embodiments, the credential is information possessed by the user. In another of these embodiments, the credential is user authentication information. In other embodiments, a credential associated with a client is associated with a network. In one of these embodiments, the credential is information associated with a network to which the client may connect. In another of these embodiments, the credential is information associated with a network collecting information about the client. In still other embodiments, a credential associated with a client is a characteristic of the client.

In some embodiments, the user authentication performed by the server 106 or appliance 200 may suffice to authorize the use of each hosted application program presented to the client 102, although such applications may reside at another server 106'. Accordingly, when the client 102 launches (i.e., initiates execution of) one of the hosted applications, additional input of user credentials by the client 102 may be unnecessary to authenticate use of that application. Thus, a single entry of the user credentials may serve to determine the available applications and to authorize the launching of such applications without an additional, manual log-on authentication process by the user.

In one embodiment, an appliance 200 receives a request for access to a resource from a client 102. In another embodiment, the appliance 200 receives a request for access to a virtual private network. In still another embodiment, the appliance 200 makes a determination as to whether to grant access and what level of access to grant. In yet another embodiment, the appliance 200 makes a determination as to what type of connection to establish when providing the client with access to the application.

In some embodiments, decisions regarding whether and how to grant a user access to a requested resource are made responsive to determinations by a policy engine regarding whether and how a client 102 may access an application. In one of these embodiments, a decision regarding a level of access is made responsive to a policy engine determination. In another of these embodiments, a decision regarding a type of access is made responsive to a policy engine determination. In still another of these embodiments, a decision regarding a type of connection is made responsive to a policy engine determination. The policy engine may collect information about the client 102 prior to making the determination. In some embodiments, the policy engine resides on the appliance 200. In other embodiments, the appliance 200 is in communication with a police engine residing on a server 106.

D. IIP Addressing Environment

Figure 4:
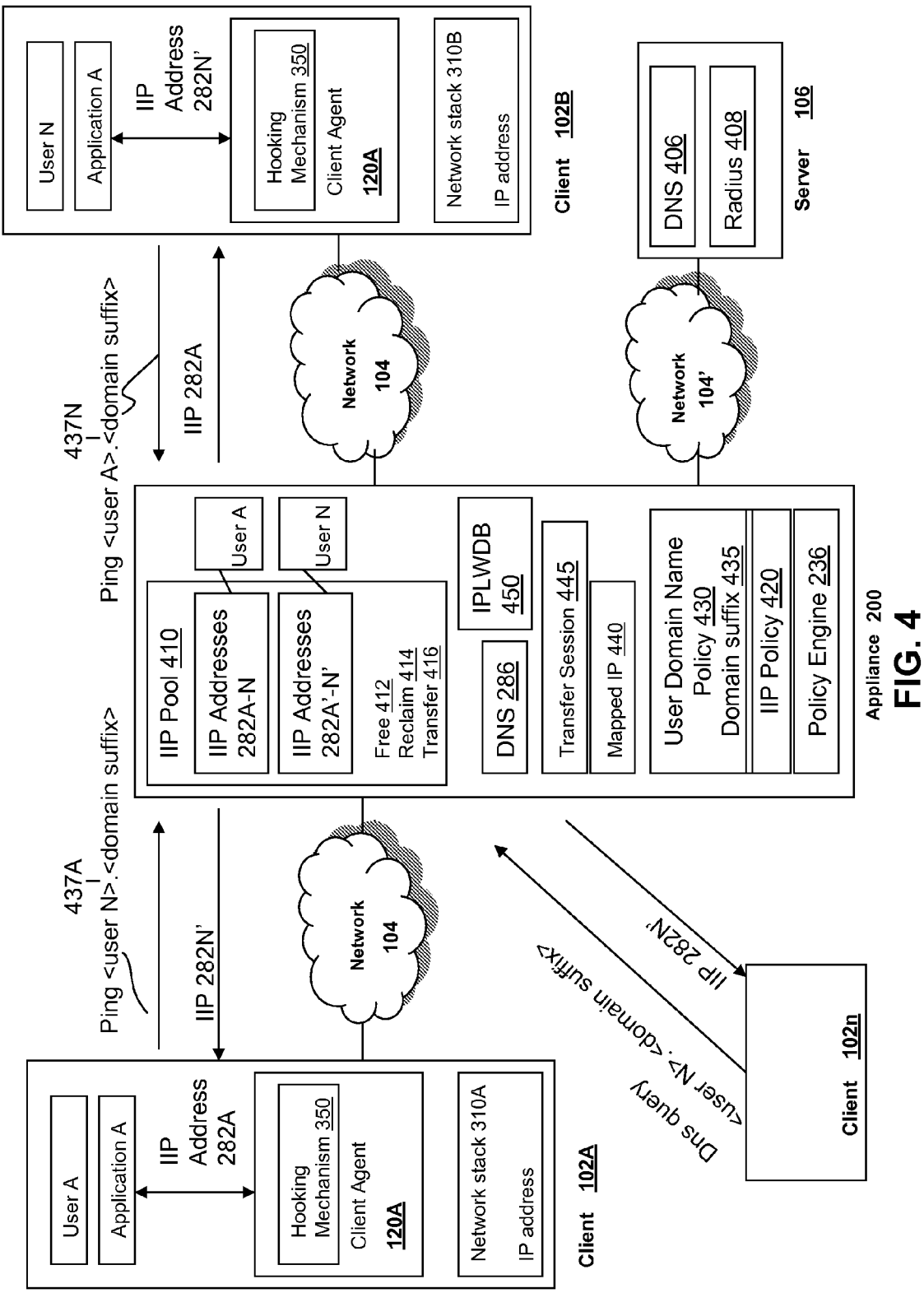
FIG. 4 is a block diagram of an embodiment of an appliance and client providing an Intranet Internet Protocol (IIP) environment.

Referring now to FIG. 4, an embodiment of an environment for providing Intranet Internet Protocol (IIP) addresses to users and/or clients is depicted. The IIP addressing environment provided by the appliance 200 and/or client 102 may be used for: 1) assigning, based on policy, temporal and/or status information, an IIP address 282 to a user from a plurality of IIP addresses designated to the user for accessing a network via the appliance, 2) providing an IIP address 282 assigned to the user to an application on a client requesting resolution of the internet protocol address of the client 102, and 3) providing a mechanism to determine the IIP address 282 assigned to the user via a configurable user domain name associated with the user's IIP address 282.

In brief overview, the appliance 200 provides an IIP pool 410 of IIP addresses 282A-282N to be assigned and/or used by one or more users. The IIP pool 410 may include a pool 412 of free or unassigned IIP addresses, i.e. a free pool 413, a pool 414 of IIP addresses that may be reclaimed, i.e., a reclaim pool 414, and/or a pool 416 of IIP addresses that may be assigned via transfer, i.e., a transfer pool 416, such as via the transfer of a session 445, e.g., a SSL VPN session provided by the appliance 200. In some embodiments, if an IIP address 282 is not available from the IIP pool 410, then a mapped IP (MIP) 440 may be used to provide a client or a user an IIP address 282. For mapped IP, the appliance 200 intercepts an incoming client's IP and replaces it with a MIP address. Any servers sitting behind the appliance 200 see a MIP instead of a the client's actual IP address in the IP header field of traffic directed to them.

A set of one or more IIP addresses 282A-282N may be designated for or associated with a user. In one embodiment, the appliance 200 via an IIP policy 420 provides a user with an IIP address from a plurality of IIP addresses 282A-282N designated for the user. For example, the IIP policy 420 may indicate to provide the user with the most recently used IIP address 282 of the user. The appliance 200 includes a database or table 450 for maintaining an association of IIP addresses 286 to entities, such as users.

In additional overview, the appliance 200 provides a mechanism for querying the IIP address 282 assigned to and/or used by the user. The appliance 200 may be configured with a user domain name policy 430 specifying a domain suffix 435 to associate with an identifier of the user. For example, the domain name policy 430 may indicate to append the domain suffix "mycompany.com" 435 to a user identifier, such as the user id of the user when logged into the appliance 200 or network 104'. As a result, in some embodiments, the appliance 200 associates the user domain name 437 of <user id>.<domain suffix>, e.g., "userA.mycompany.com" with the IIP address assigned to the user. The appliance 200 may store in the domain name service (DNS) 286, or DNS cache the user domain name 437 in association with the IIP address 282. The appliance 200 can resolve any DNS queries or ping commands based on the user domain name 437 by providing the associated IIP address 232.

In further overview, the client agent 120 provides a mechanism by which the IIP address 282 is provided to an application. The client agent 120 includes an interception or hooking mechanism 350 for intercepting any application programming interface (API) calls of the application related to determining or resolving the internet protocol address of the client 102, such as for example, gethostbyname. Instead of providing the internet protocol address of the client 102 identified in the network stack 310, e.g., the IP address of the client on network 104, the client agent 120 provides the IIP address 282 assigned to the user via the appliance 200, such as the IIP address 282 of the client 102 or user of the client 102 on the second network 104' connected from the client 102 on a first network 104 via a SSL VPN connection of the appliance.

In more detail, the appliance 200 provides an IIP address 282 to a user or the client of the user. In one embodiment, the IIP address 282 is the internet protocol address of the user, or the client used by the user, for communications on the network 104' accessed via the appliance 200. For example, the user may communicate on a first network 104 via a network stack 310 of a client 102 that provides an internet protocol (IP) address for the first network 104, such as for example, 200.100.10.1. From client 102 on the first network 104, the user may establish a connection, such as an SSL VPN connection, with a second network 104' via the appliance 200. The appliance 200 provides an IIP address 282 for the second network 104' to the client and/or user, such as 192.10.1.1. Although the client 102 has an IP address on the first network 104 (e.g., 200.100.10.1), the user and/or client has an IIP address 282 or second network IP address (e.g., 192.10.1.1) for communications on the second network 104'. In one embodiment, the IIP address 282 is the internet protocol address assigned to the client 102 on the VPN, or SSL VPN, connected network 104'. In another embodiment, the appliance 200 provides or acts as a DNS 286 for clients 102 communicating via the appliance 200. In some embodiments, the appliance 200 assigns or leases internet protocol addresses, referred to as IIP addresses 282, to client's requesting an internet protocol address, such as dynamically via Dynamic Host Configuration Protocol (DHCP).

The appliance 200 may provide the IIP address 282 from an IIP pool 410 of one or more IIP addresses 282A-282N. In some embodiments, the appliance 200 obtains a pool of internet protocol addresses on network 104' from a server 106 to use for the IIP pool 410. In one embodiment, the appliance 200 obtains an IIP address pool 410, or portion thereof, from a DNS server 406, such as one provided via server 106. In another embodiment, the appliance 200 obtains an IIP address pool 410, or portion thereof, from a Remote Authentication Dial In User Service, RADIUS, server 408, such as one provided via server 106. In yet another embodiment, the appliance 200 acts as a DNS server 286 or provides DNS functionally 286 for network 104'. For example, a vServer 275 may be configured as a DNS 286. In these embodiments, the appliance 200 obtains or provides an IIP pool from the appliance provided DNS 286.

The appliance 200 may designate, assign or allocate IIP addresses for any of the following entities: 1) user, 2) group, 3) vServer, and d) global. In some embodiments, the IIP pool 410 may be designated or used for assigning IIP addresses 286 to users. In other embodiments, IIP pool 410 may include IIP addresses 286 to be assigned to or used by services of the appliance 200, such as vServers 275. In other embodiments, IIP pool 410 may include IIP addresses 286 to be assigned to or used by global or group entities of the appliance 200. In one embodiment, the IIP pool 410 may comprise a single pool of IIP addresses. In another embodiment, the IIP pool 410 may comprise multiple pools or sub-pools of IIP addresses. In some embodiments, the IIP pool 410 comprises a free IIP pool 412. In other embodiments, the IIP pool 410 comprises a reclaimed IIP pool 414. In yet another embodiment, the IIP pool 410 comprises a transfer IIP pool 416. In some embodiments, the IIP pool 410 comprises any combination of a free IIP pool 412, a reclaimed IIP pool 414 and/or a transfer IIP pool 416. In one embodiment, the free IIP pool 413 comprises IP addresses which are available for usage. In some embodiments, the reclaimed IIP pool 414 comprises IP addresses which are associated with an entity, such as a user, group or vServer, but are inactive and available for usage. In other embodiments, the transfer IIP pool 416 comprises IP addresses that are active but can be made available through a transfer login or transfer session process.

In some embodiments, the appliance 200 may list or enumerate internet protocol addresses used for IIP addresses in the IIP pool 410, or in some embodiments, any of the sub-pools 412, 414, 416, in an order or priority. In some embodiments, the appliance 200 enumerates or lists the IIP addresses of a pool according to the following scheme: 1) user, 2) group, 3) vServer, and d) global. In one embodiment, the appliance 200 provides an IIP address from an IIP pool 410 for assignment based on the order or priority. For example, the appliance 200 may try to obtain a free IIP address from the user associated IP free pool 412 first. If an IIP address is not available from the user portion of the pool, the appliance 200 may then try to obtain a free IIP address from the group portion of the pool 412, and so on, via the vServer and global portions of the pool until an IIP address can be assigned. Likewise, the appliance 200 may prioritize the sub-pools 412, 414, and 416, in any order or combination, to search for IIP addresses to assign. For example, the appliance 200 may first search the free IIP pool 412, then the reclaimed IIP pool 416 and then the transfer IIP pool 416 for IIP addresses.

The appliance 200 may comprise any type and form of database or table 450 for associating, tracking, managing or maintaining the designation, allocation and/or assignment of IIP addresses to a 1) user, 2) group, 3) vServer, and/or d) global entities from the IIP pool 410. In one embodiment, the appliance 200 implements an Internet Protocol Light Weight Database Table (IPLWDB) 450. In some embodiments, the IPLWDB 450 maintains entries which provide a one-to-one mapping of an IP address with or to an entity. In another embodiment, once an entity uses or is assigned an IIP address 282, the IPLWDB maintains the association between the entity and IIP address, which may be referred to as "IIP stickiness" or having the IIP address "stuck" to an entity. In one embodiment, IIP stickiness refers to the ability or effectiveness of the appliance 200 to maintain or hold the association between the entity and the IIP address. In some embodiments, IIP stickiness refers to the ability or effectiveness of the appliance 200 to maintain the entity/IIP address relationship or assignment via any changes in the system, such as a user logging in and out of the appliance, or changing access points. In some embodiments, the IPLWDB 450 comprises a hash table, which is hashed based on any one or more of the 1) user, 2) group, 3) vServer, and/or d) global entities. The IPLWDB 450 may comprise a hash of the user and any other information associated with the user, such as client 102, or network 104 of client 104.

The IPLWDB 450 may track, manage or maintain any status and temporal information related to the IIP address/entity relationship. In one embodiment, the IPLWDB 450 maintains if the IIP address for the entity is currently active or inactive. For example, in some embodiments, the IPLWDB 450 identifies an IIP address 282 as active if it is currently used in an SSL VPN session via the appliance 200. In another embodiment, the IPLWDB 450 maintains temporal data for the IIP address use by the entity: such as when first used, when last used, how long has been used, and when most recently used. In other embodiments, the IPLWDB 450 maintains information on the type or source of usage, such as, in the case of user, what client 102 or network 104 used from, or for what transactions or activities were performed using the assigned IIP address.

In some embodiments, the IPLWDB 450 tracks, manages and maintains multiple IIP addresses used by an entity. The IPLWDB 450 may use one or more IIP policies 420 for determining which IIP address of a plurality of IIP addresses to assign or provide to an entity, such as a user. In one embodiment, the IIP policy 420 may specify to provide for assignment the most recently or last used IIP address of the user. In some embodiments, the IIP policy 420 may specify to provide for assignment the most used IIP address of the user. In other embodiments, the IIP policy 420 may specify to provide the least used IIP address of the user. In another embodiment, the IIP policy 420 may specify the order or priority for which to provide IP addresses of the user, for example, from the most recent to least recent. In yet another embodiment, the IIP policy 420 may specify which IIP pool 410 or sub-pool 412, 414, 416 to use, and/or in which order. In some embodiments, the IIP policy 420 may specify whether or not to use a mapped IP address, and under what conditions, such as when an inactive IIP address of the user is not available. In other embodiments, the IIP policy 420 may specify whether or not to transfer a session or login of the user, and under what conditions.

In some embodiments, the appliance 200 can be configured to bind or make the association of one or more IIP addresses 282 to an entity, such as a user. For example, in some embodiments, the associations in IPLWDB 450 are updated or maintained via bind and unbind commands via the appliance 200. In one embodiment, the following command can be issued to the appliance 200 via a command line interface (CLI) 212 or GUI 210:

```
bind aaa user <user-name> [-intranetip <ip_addr>] [<netmask>]
```

For example, if an administrator of the appliance 200 intends to associate the IIP addresses 282 of 10.102,4,189, 10.102.4.1 and 10.102.4.2 with a user "nsroot", then the administrator may issue the following commands:

```
bind aaa user nsroot -intranetip 10.102.4.189   255.255.255.255
bind aaa user nsroot -intranetip 10.102.4.0 255 255.255.255.252
```

In one embodiment, the netmask value provides a mechanism for assigning a range of IIP addresses to a user. In some embodiments, the netmask value is optional and the default is 255.255.255.255. For example, the following commands are equivalent:

```
bind aaa user nsroot -intranetip 10.102.4.189
bind aaa user nsroot -intranetip 10.102.4.189 255.255.255.255
```

Likewise, the administrator 200 or other user may disassociate an IIP address with an entity, such as a user, via an unbind command. In some embodiments, the unbind command may have similar format as the bind command. In one embodiment, if the IIP address is active, the bind or unbind command will not be processed. In other embodiments, if the IIP address is active, the appliance transmits a reset (RST) command to all the client and server connections associated with the active session, and then proceeds to make any changes associated with the issued bind or unbind command. In another embodiment, the appliance 200 updates the associated client and server connections with any updated IIP address information. In one embodiment, the appliance 200 re-establishes the associated client and server connections with the changed IIP address.

In some embodiments, the appliance 200 provides a mechanism and/or technique for determining the IIP address 282 of a user. In one embodiment, the appliance 200 is configured via a user domain name policy 430, which provides information on specifying a user domain 437. In one embodiment, the user domain policy 430 specifies a domain suffix 435 to be used in forming the user domain 437. For example, the user domain policy 430, in some embodiments, may be specified by the following command:

```
add vpn sessionaction <name> [-httpPort <port>...]
[-winsIP <ip_addr>] ...
....
[-homepage <URL>] [-iipdnssuffix <string>]
```

In one embodiment, the iipdnssuffix 435 specifies a string, such as a domain name, that will be appended to the user id/name to form a user domain name 437. The user id may be the login name of the user, an alias or nickname of the user, or any user identification associated with the user's profile. In one embodiment, the domain suffix 435 identifies the domain name of the network 104 or network 104'. In other embodiments, the domain suffix 435 may comprise a domain name or host name of the appliance 200. In yet other embodiments, the domain suffix 435 may be any desired, predetermined or custom string for identifying the user domain name 437.

In the case of a user having multiple IIP addresses 282 active concurrently, the user domain name policy 430 may specify an instance identifier or any other character or symbol to differentiate between a first instance and a second instance of a VPN session of the user. For example, the policy 430 may specify to include a number after the user id, such as <userid><Instance Number> or <userid>_<#>. In other embodiments, the policy 430 specifies to only associate or provide a single user domain name 437 for a user. For example, in one embodiment, the user domain name 437 is associated with the first session. In other embodiments, the user domain name 437 is associated with the most recent session.

Although the user domain policy 430 is described as providing a domain suffix 435 to a user identifier to form the user domain name 437, the user domain policy 430 may specify any portion of the user domain name 437. For the example, the user domain policy 430 may specify the format for the user identifier or which type of user id to use, such as an identified portion of the user's profile. In some embodiments, by default, the domain suffix 435 may be the same domain name as the network 104. In another embodiment, the user domain policy 430 may specify a format for or additions or modifications to the domain name of the network 104 in providing the user domain name 437.

When a user logs in and gets assigned an IIP address 282, the appliance 200 stores a record associating the user id/name, or user domain name 437, and IIP address 282. In some embodiments, the appliance 200 stores the record in DNS 286, or a DNS cache, on the appliance 200. In another embodiment, the appliance 200 stores the record in a DNS 406 on server 106. In other embodiments, the appliance 200 stores the record in the IPLWDB 450. The appliance 200 can query a DNS with the user domain name 437 and obtain the assigned IIP address 286. A user logged into the appliance 200 via SSL VPN get the IIP address of another user by using DNS instead of having to remember the IP address. For example, a user on client 102 can ping the IIP address of another user. The client agent 120 can intercept such requests and query the DNS 286 of the appliance 200 to determine the IIP address 282 assigned the user domain name. In some embodiments, without logging into the appliance 200 via SSLVPN, a client can query the IIP address 282 of a user by sending a DNS query request to the DNS 286 of the appliance 200.

In some embodiments, the client agent 120 provide an interception or hooking mechanism 350 for intercepting any requests for the local IP address of the client 102, and returning or replying with an IIP address 282, such as the IIP address 282 assigned to the user. In some embodiments, the hooking mechanism 350 may include any of the mechanisms of the interceptor 350 described above in conjunction with FIG. 3. In other embodiments, the hooking mechanism 350 may include any type and form of hooking mechanism 350, such as application level hook procedure or function. In one embodiment and by way of example, the hooking mechanism 350 comprises any of the Windows API calls for setting a application hooking procedure, such as via the SetWindowsHookEx API call. In some embodiments, the SetWindowsHookEx function installs an application-defined hook procedure into a hook chain.

Depending on the operating system of the client 102, the client agent 120 may use the corresponding APIs of the OS to install, add, modify or use a hook procedure 350 to hook or intercept messages of an application. A hook procedure 350 may be installed to monitor the system for certain types of events, which are associated either with a specific thread or with all threads in the same space as the calling thread. In one embodiment, a hook, such as hooking mechanism 350, is a point in the system message-handling mechanism where an application, such as the client agent 120, can install a subroutine to monitor the message traffic in the system and process certain types of messages before the messages reach the target processing function. In some embodiments, the hooking mechanism 350 may intercept or hook any of the following function calls or messages of an application: gethostbyname, getaddrinfo, and getsockname. In other embodiments, the hooking mechanism 350 may hook any of the Windows Socket API extensions such as WSAIoctl, WSALookupServiceBegin, WSALookupServiceNext, and WSALookupServiceEnd.

In one embodiment, the client agent 120 transmits a request to the appliance 200 to determine the IIP address 282 of the host name intercepted by the hooking mechanism 350. In some embodiments, the appliance 200 looks up the corresponding IIP address 282 of the host name of the client 102 in a DNS, such as DNS 286 on appliance 200 or DNS 406 on a server. In other embodiments, the client agent 120 uses the user domain name 437 of the user associated with the application to ping or DNS query the IIP address 282. In some embodiments, the client agent 120 transmits the local IP address of the client 102 and the appliance 200 queries the corresponding IIP address 282. In one embodiment, the appliance 200 stores the name of the client 102 in association with the user and/or IIP address in the IPLWDB 450. In other embodiments, the client agent 120 has cached the IIP address of the user or client 102, and thus, does not need to query the appliance 200. For example, upon establishment of a SSL VPN connection, the appliance 200 may transmit the IIP address 282 to the client 102. With the hooking mechanism 350, instead of providing the client's local IP address (the client's address on the first network 104), the client agent 120 provides the IIP address 282 of the client (the client's or user's address on the second network 104').

In some embodiments, the hooking mechanism 350 of the client agent 120 is used to return the IIP address for supporting the transparent and seamless use of online collaboration tools via SSL VPN connections. In one embodiment, the application is a NetMeeting application manufactured by the Microsoft Corporation of Redmond, Wash. In some embodiments, any of the applications 230 may comprise any type of hosted service or products, such as GoToMeeting™ provided by Citrix Online Division, Inc. of Santa Barbara, Calif., WebEX™ provided by WebEx, Inc. of Santa Clara, Calif., or Microsoft Office LiveMeeting provided by Microsoft Corporation of Redmond, Wash. With the hooking mechanism 350 providing the IIP address 282 assigned to the client via the SSL VPN connection, the application does not need to be modified to work as designed via the SSL VPN session. The hooking mechanism 350 provides the IIP address 282 of the client 102 or user if the client 102 instead of the local IP address when making a request to get the IP address of the client 102.

Communication between a program neighborhood-enabled client 102 and a server 106 or appliance 200 may occur over a dedicated virtual channel that is established on top of an ICA virtual channel. In some embodiments, the communication occurs using an XML service. In other embodiments, the client 102 runs a client-side dialog that acquires the credentials of a user of the client 102. In still other embodiments, a user management subsystem on a server 106 receiving the credentials of the user may return a set of distinguished names representing the list of accounts to which the user belongs. Upon authentication, the server 106 may establish a program neighborhood virtual channel, a control channel, or other communications channel. In yet other embodiments, an acceleration program 302 may also be transmitted to the client 102 in response to a client 102 request.

In some embodiments, a client 102 may use the client agent 120 to browse farm 38, servers 106 and applications in the farm 38. In one embodiment, each server 106 includes an ICA browsing subsystem to provide the client 102 with browsing capability. After the client 102 establishes a connection with the ICA browser subsystem of any of the servers 106, that browser subsystem supports a variety of client 102 requests. Such requests include: (1) enumerating names of servers in the farm, (2) enumerating names of applications published in the farm, (3) resolving a server name and/or application name to a server address that is useful to the client 102. The ICA browser subsystem also supports requests made by clients 102 running a program neighborhood application that provides the client 102, upon request, with a view of those applications within the farm 38 for which the user is authorized. The ICA browser subsystem forwards all of the above-mentioned client requests to the appropriate subsystem in the server 106.

In one embodiment, a user of the client 102 selects an application for execution from a received enumeration of available applications. In another embodiment, the user selects an application for execution independent of the received enumeration. In some embodiments, the user selects an application for execution by selecting a graphical representation of the application presented on the client 102 by a client agent 120. In other embodiments, the user selects an application for execution by selecting a graphical representation of the application presented to the user on a web server or other server 106. In some embodiments, an appliance 200 or acceleration program 302 accelerates delivery of the graphical representation. In some embodiments, an appliance 200 caches or stores the graphical representation. In some embodiments an appliance 200 may cache or store any and all of the associated applications or portions of the associated applications.

In some embodiments, when a client 102 connects to the network 104, the user of the client 102 provides user credentials. User credentials may include the username of a user of the client 102, the password of the user, and the domain name for which the user is authorized. Alternatively, the user credentials may be obtained from smart cards, time-based tokens, social security numbers, user passwords, personal identification (PIN) numbers, digital certificates based on symmetric key or elliptic curve cryptography, biometric characteristics of the user, or any other means by which the identification of the user of the client 102 can be obtained and submitted for authentication. The server 106 or appliance 200 responding to the client 102 can authenticate the user based on the user credentials.

In some embodiments, the client 102 provides credentials upon making a request for execution of an application to a server 106, directly or through an appliance 200. In one of these embodiments, the client 102 requests access to an application residing on a server 106. In another of these embodiments, the client 102 requests access to a network on which a desired resource resides. In other embodiments, the client 102 provides credentials upon making a request for a connection to an appliance 200. In one of these embodiments, the client 102 requests access to a virtual private network. In another of these embodiments, the client 102 requests a network address on the virtual private network. In still another of these embodiments, the client 102 initiates a connection to the appliance 200.

In some embodiments, the user provides credentials to the server 106 or appliance 200 via a graphical user interface presented to the client 102 by the server 106 or appliance 200. In other embodiments, a server 106 or appliance 200 having the functionality of a web server provides the graphical user interface to the client 102. In still other embodiments, a collection agent transmitted to the client 102 by the server 106 or appliance 200 gathers the credentials from the client 102.

In one embodiment, a credential refers to a username and password. In another embodiment, a credential is not limited to a username and password but includes, without limitation, a machine ID of the client 102, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the server 106 or appliance 200, date or time of access request including adjustments for varying time zones, and authorization credentials.

In some embodiments, a credential associated with a client 102 is associated with a user of the client 102. In one of these embodiments, the credential is information possessed by the user. In another of these embodiments, the credential is user authentication information. In other embodiments, a credential associated with a client is associated with a network. In one of these embodiments, the credential is information associated with a network to which the client may connect. In another of these embodiments, the credential is information associated with a network collecting information about the client. In still other embodiments, a credential associated with a client is a characteristic of the client.

In some embodiments, the user authentication performed by the server 106 or appliance 200 may suffice to authorize the use of each hosted application program presented to the client 102, although such applications may reside at another server 106'. Accordingly, when the client 102 launches (i.e., initiates execution of) one of the hosted applications, additional input of user credentials by the client 102 may be unnecessary to authenticate use of that application. Thus, a single entry of the user credentials may serve to determine the available applications and to authorize the launching of such applications without an additional, manual log-on authentication process by the user.

In one embodiment, an appliance 200 receives a request for access to a resource from a client 102. In another embodiment, the appliance 200 receives a request for access to a virtual private network. In still another embodiment, the appliance 200 makes a determination as to whether to grant access and what level of access to grant. In yet another embodiment, the appliance 200 makes a determination as to what type of connection to establish when providing the client with access to the application.

In some embodiments, decisions regarding whether and how to grant a user access to a requested resource are made responsive to determinations by a policy engine regarding whether and how a client 102 may access an application. In one of these embodiments, a decision regarding a level of access is made responsive to a policy engine determination. In another of these embodiments, a decision regarding a type of access is made responsive to a policy engine determination. In still another of these embodiments, a decision regarding a type of connection is made responsive to a policy engine determination. The policy engine may collect information about the client 102 prior to making the determination. In some embodiments, the policy engine resides on the appliance 200. In other embodiments, the appliance 200 is in communication with a police engine residing on a server 106.

E. IIP Address "Stickiness" to a User

Figure 5:
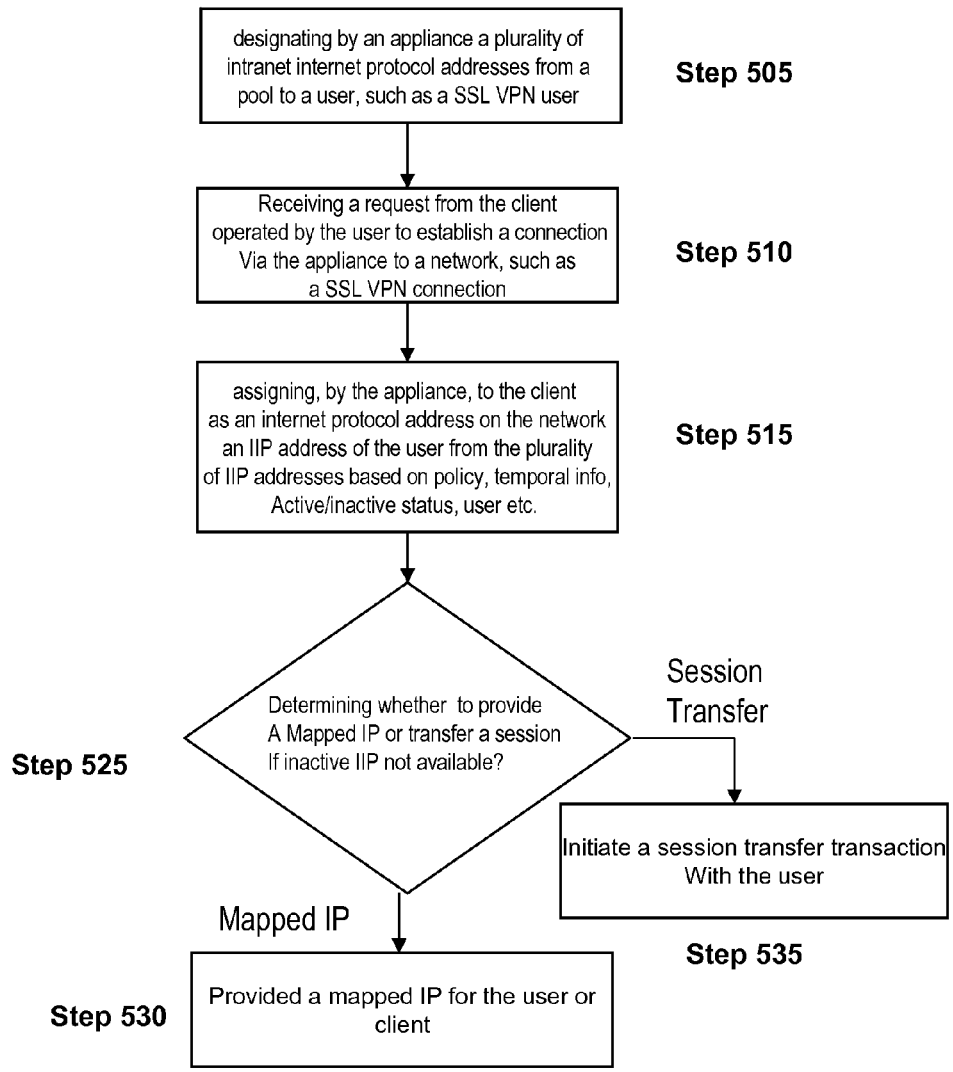
FIG. 5 is a flow diagram depicting steps of an embodiment of a method for practicing a technique for assigning an IIP address to a user.

Referring now to FIG. 5, an embodiment of steps of a method 500 for assigning an IIP address 282 to a user is depicted. In one embodiment, the method 500 is practiced to provide IIP address stickiness for a user. In some embodiments, an SSL VPN user may login and logout of the appliance 200 multiple times from different computers. For example, the user may roam from computing device to computing device or switch from one location to another. In some example, an SSL VPN user may be on a mobile device and have the network connectivity disrupted causing the device to re-establish the SSL VPN connection. With the techniques depicted by method 500, the SSL VPN user may get assigned the same IIP address 282 for each of those sessions. In some embodiments, the appliance 200 may be configured with policies 420 specifying what IIP address 282 should be assigned to a user.

In brief overview of method 500, at step 505, the appliance 200 designates a plurality of IIP address 282A-292N to a user, such as an SSL VPN user, from a pool 410 of IIP addresses. At step 510, the appliance 200 receives a request from a client 102 operated by the user to establish a connection via the appliance 200 to a network 104', such as an SSL VPN connection. At step 515, the appliance 200 assigns to the client or the user an IIP address 282 on network 104' from the IIP address pool 410. The appliance 200 may make the assignment based on policy 420, temporal information or the status of any of the designated IIP addresses 282A-282N for the user. For example, in one embodiment, the appliance 200 assigns the most recently used IIP address 282 of the user to the client 102. At step 525, in some embodiments, the appliance 200 determines whether to provide a mapped IP or to transfer a session. For example, if an inactive IIP address 282 is not available for assigning to the user, the appliance 200 may opt to use a MIP address at step 530 or to request the user to transfer an active session to the current request at step 535.

In further detail, at step 505, the appliance 200 may designate or allocate any set of one or more IIP addresses 282A-282N for a user. In some embodiments, the appliance 200 designates one IIP address 282. In other embodiments, the appliance 200 designates up to a predetermined number of multiple IIP addresses 282A-282N for the user, such as 2, 3, 4, 5, 6, 7, 9, 10, 15, 20 or 26 IIP addresses. In one embodiment, the multiple IIP addresses 282A-228N comprise a continuous range of IP addresses on network 104', for example, IP addresses 200.10.1.1 to 200.20.1.10. In another embodiment, the multiple IIP addresses 282A-282N comprises any set of IP addresses on network 104' that are not subsequent to each other. In yet another embodiment, the multiple IIP addresses 282A-282N are any combination of subsequent IP address ranges and single or separate IP addresses.

In one embodiment, the appliance 200 obtains a set of internet protocol addresses from a DNS for the network 104' accessed via the appliance 200. For example, the appliance 200 may obtain a set of IP addresses for the intranet from a DNS server 406 or a RADIUS server 508. In another example, the appliance 200 may provide or act as a DNS 286 and allocate the IP addresses for the intranet. In some embodiments, one or more IIP addresses 282A-282N may be associated or designated with a user via a bind or similar command issued at the CLI 212 or GUI 210 of the appliance 200. In other embodiments, the appliance 200 may obtain from a DNS IP addresses 282A-282N on network 104's that are associated with a user. In some embodiments, the appliance 200 designates a portion of the free IIP pool 412 to the user. In other embodiments, the appliance 200 may designate or reclaim a portion of the reclaim IIP pool 414 to the user.

At step 510, the user via client 102 transmits a request to the appliance 200 to establish a connection to the network 104'. In some embodiments, the appliance 200 identifies the user from the request. In other embodiments, the appliance 200 identifies the user from receipt of login or authentication credentials. For example, in some embodiments, the user submits a user id and password via a URL or web-page of the appliance 200. In one embodiment, the client agent 120 requests to establish a tunnel connection with the appliance 200 using any type and form of tunneling protocol. In another embodiment, the client agent 120 requests to establish a virtual private network connection via the appliance 200 to a network 104. For example, the client agent 120 may establish a virtual private network connection with the appliance 200 to connect the client 102 on the first network 104 to a second network 104'. In some embodiments, the client agent 120 establishes a SSL VPN connection with the appliance 200. In yet another embodiment, the client agent 120 establishes a tunnel or virtual private network connection using Transport Layer Secure (TLS) protocol. In one embodiment, the client agent 120 requests to establish a tunnel connection using the Common Gateway Protocol (CGP) manufactured by Citrix Systems, Inc. of Ft. Lauderdale, Fla.

At step 515, the appliance 200, in response to receiving the request from the user or the client 102, assigns an IIP address 282 on the second network 104' from the designated set of IIP addresses 282A-282N of the user. In one embodiment, the appliance 200 determines the IIP address 282 to assign based on an IIP policy 420. For example, in some embodiments to maintain IIP stickiness, the appliance 200 via IIP policy 420 determines the most recently used IIP address 282 of the user. In other embodiments to maintain IIP stickiness, the appliance 200 via information tracked by the IPLWDB 450 determines the most used IIP address 282 of the user from the set of IIP addresses 282A-282N. In some embodiments, in the case of one or more active SSL VPN sessions, the appliance 200 determines the next most recently used or most used IIP address 282 of the user. In yet other embodiments, the appliance 200 determines an appropriate, desired or policy-driven IIP address 282 to assign the user from the designated set of user IIP addresses 282A-282N by any combination of policy 435, status of sessions associated with the user's IIP addresses 282A-282N, and temporal information of sessions associated with the user's IIP addresses 282A-282N.

In one embodiment, the appliance 200 may use any subpool 412, 414 or 416 of the IP pool 410 to assign an IIP address 282 to the user. In some embodiment, the free IIP pool 412 may not have an available IIP address of the user. For example, all the IIP addresses of the user are marked as active or already assigned to a session. As such, in these embodiments, the appliance 200 may search the reclaim IIP pool 414 for any IIP addresses of the user assigned but available to reclaim. In still another embodiment, the appliance 200 may search the transfer IIP pool 416 for any IIP addresses of the user. In yet other embodiments, the appliance 200 may search any designated allocations or pools for group, global or vServer IIP addresses for an IP address that may be designated and assigned for the user or otherwise provided as a mapped IP address. In some embodiments, the appliance 200 searches portions of the IP pool 410 for IIP addresses of the user in an ordered or prioritized manner, such as the free IIP pool 412, first, the reclaim IIP pool 414, second and the transfer IIP pool 416 third. In one embodiment, the search order or priority may be specified by a policy 420.

In many embodiments, the appliance 200 provides a previously assigned IIP address 282 of the user from the free IIP pool 412 or the reclaim IIP pool 414. In some embodiments, the appliance 200 provides the user with the most recently or last assigned IIP address to provide IIP stickiness. However, at step 525, in some embodiments, the appliance 200 determines whether to provide a mapped IP 440 or a transfer session 445. In some embodiments, an IIP policy 420 specifies whether to use a mapped IP 440 or a transfer session 445 in cases of the appliance 200 not finding an available IIP address 282 of the user from the free IIP pool 412 and/or the reclaimed IIP pool 414. In other embodiments, an IIP policy 420 may specify to use a Mapped IP 440 in cases of the appliance 200 not finding an inactive IIP address in any pool 410, or an available IIP address in the free IIP pool 412. In one embodiment, if the IIP policy 420 specifies to use a Mapped IP 440 at step 525, then, at step 530 provides a Mapped IP 440 instead of using an assigned IIP address 272.

In the cases of using a Mapped IP 440, the appliance 200 modifies any packets to and from the client 102 with an IIP address 282 of the network 104'. For example, instead of assigning the user a user designated IIP address 282, the appliance 200 may use any available IIP address of the IIP pool 410, such as a globally available IIP address. The appliance 200 may modify the packets transmitted from the client 102 to have this mapped IP 440 when transmitted from the appliance 200 to a server 106. Also, in some embodiments, the appliance 200 may modify packets transmitted from the server 106 to the client 102 to change the Mapped IP 440 to the IP address of the client 102, such as the IP address of the client 102 on the first network 104. In some embodiments, the appliance 200 stores in the IPLWDB 450 the association of the mapped IP 440 to the user and/or client 102.

In another embodiment, if the IIP policy 420 specifies to use a transfer session 445 at step 525, then, at step 535, the appliance 200 initiates a transfer of an active session of the user. In one embodiment, upon receiving, by the appliance 200, a request from a first client operated by a user to establish a VPN session, the appliance may create a temporary VPN session with the client. In some embodiments, the appliance 200 may refuse to accept any data received via the temporary session until a new VPN session is created from temporary session. In other embodiments, the temporary VPN session may be allocated less resources by the appliance than would be allocated to a standard VPN session. In another embodiment, a temporary VPN session may not be assigned an IIP address 282, or may otherwise be prevented from receiving data. In some embodiments, the appliance may identify a number of properties associated with the existing session. In one embodiment, after identifying an existing session, the appliance 200 may transmit a message to the user via the previously existing session indicating the current session attempt.

In some embodiments, the appliance 200 may transmit to the client 102 of the user a request for information corresponding to whether to terminate the previous session. In some embodiments, this request may comprise a web page which accepts user input. For example, the web page may comprise an enumerated list of existing sessions, with input means for the user to a select one or more sessions to be terminated. In other embodiments, this request may comprise a communication to a client agent 120, which then may respond on behalf of the user. In some embodiments, this request may comprise a request for information corresponding to whether to terminate one or more of a plurality of previous sessions.

In one embodiment, the request may comprise information relating to any of the properties of the existing session. In some embodiments, this information may be displayed to the user along with the choice of whether to terminate the existing session. For example, a web page may be displayed to the user stating "you have a previously existing session which was opened July 2nd at 10:30 am, do you wish to close?" In other embodiments, this information may be transmitted to a client agent which may then make a determination whether to close a previously existing session based on the properties of the previously existing session. For example, a client agent 120 executing on the client making the new session request may determine to automatically terminate a previous session in the event that no applications are currently associated with the previous session.

In some embodiments, the request may also comprise a request for information relating to whether the user would like to transfer data from a previous session to a current session. For example, if a user was remotely executing an application, the user may wish to resume the remote execution and the previous session or sessions associated with the remote execution using the current session. After transmitting, from the appliance 200 to the client 102, a request for information corresponding to whether to terminate the previous session the appliance may receive, from the client or the user, a response comprising an indication to terminate the previous session. In still other embodiments, the appliance 200 may receive a response comprising a request to transfer data associated with a previous session to the current session. In these embodiments, the appliance 200 assigns the IIP address 282A of the previous session to the new session.

In the event the appliance 200 receives a response comprising an indication not to terminate the previous session, the appliance 200 may refuse to allow the user access, and terminate the temporary VPN session. In these embodiments, the appliance 200 maintains the association of the IIP addresses 282 with the previous session and does not assign the IIP address to the new session. In other embodiments, the appliance 200 may create a new VPN session unrelated to any of the identified previous sessions. In these embodiments, the appliance 200 may assign an available IIP address from another entity, such as group, vServer or global or another user, to the new VPN session.

F. Client End-Point Detection and Authorization Via Client Security String

Figure 6A:
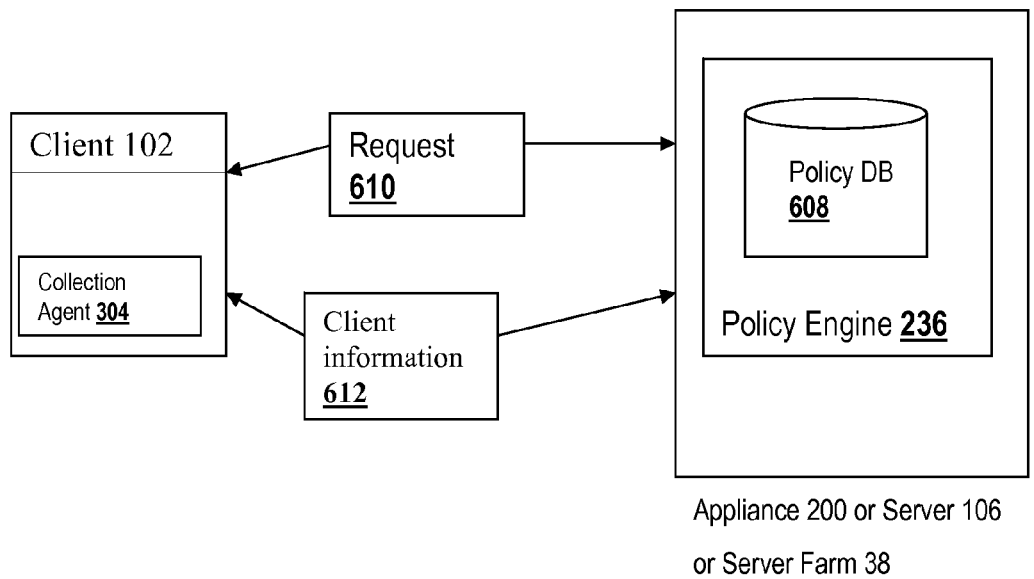
FIG. 6A is a block diagram of an embodiment of a network environment providing policy-based access to application programs for a local machine.

Referring now to FIG. 6A, one embodiment of a computer network is depicted, which includes a client 102, a collection agent 304, a policy engine 235, a policy database 608, a server farm 38, and an application server 106. In one embodiment, the policy engine 236 is a server 106. Although only one client 102, collection agent 304, policy engine 236, server farm 38, and application server 106 are depicted in the embodiment shown in FIG. 6A, it should be understood that the system may provide multiple ones of any or each of those components.

In brief overview, when the client 102 transmits a request 610 to the policy engine 236 for access to an application, the collection agent 304 communicates with client 102, retrieving information about the client 102, and transmits the client information 612 to the policy engine 236. The policy engine 236 makes an access control decision by applying a policy from the policy database 608 to the received information 612.

In more detail, the client 102 transmits a request 610 for a resource to the policy engine 236. In one embodiment, the policy engine 236 resides on an application server 106'. In another embodiment, the policy engine 236 is a server 106. In still another embodiment, the policy engine 236 resides on an appliance 200. In yet another embodiment, an application server 106' or an appliance 200 receives the request 610 from the client 102 and transmits the request 610 to the policy engine 236. In a further embodiment, the client 102 transmits a request 610 for a resource to a server 106, which transmits the request 610 to the policy engine 236.

Upon receiving the request, the policy engine 236 initiates information gathering by the collection agent 304. The collection agent 304 gathers information regarding the client 102 and transmits the information 612 to the policy engine 236.

In some embodiments, the collection agent 304 gathers and transmits the information 612 over a network connection. In some embodiments, the collection agent 304 comprises bytecode, such as an application written in the bytecode programming language JAVA. In some embodiments, the collection agent 304 comprises at least one script. In those embodiments, the collection agent 304 gathers information by running at least one script on the client 102. In some embodiments, the collection agent comprises an Active X control on the client 102. An Active X control is a specialized Component Object Model (COM) object that implements a set of interfaces that enable it to look and act like a control.

In one embodiment, the policy engine 236 transmits the collection agent 304 to the client 102. In another embodiment, an appliance 200 may store or cache the collection agent 304. The appliance 200 may then transmit the collection agent to a client 102. In other embodiments, an appliance 200 may intercept the transmission of a collection agent 304. In still another embodiment, an appliance 200 may accelerate the delivery of a collection agent 304. In one embodiment, the policy engine 236 requires a second execution of the collection agent 304 after the collection agent 304 has transmitted information 612 to the policy engine 236. In this embodiment, the policy engine 236 may have insufficient information 612 to determine whether the client 102 satisfies a particular condition. In other embodiments, the policy engine 236 requires a plurality of executions of the collection agent 304 in response to received information 612.

In some embodiments, the policy engine 236 transmits instructions to the collection agent 304 determining the type of information the collection agent 304 gathers. In those embodiments, a system administrator may configure the instructions transmitted to the collection agent 304 from the policy engine 236. This provides greater control over the type of information collected. This also expands the types of access control decisions that the policy engine 236 can make, due to the greater control over the type of information collected. The collection agent 304 gathers information 612 including, without limitation, machine ID of the client 102, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the server 106, date or time of access request including adjustments for varying time zones, and authorization credentials. In some embodiments, a collection agent gathers information to determine whether an application can be accelerated on the client using an acceleration program 302.

In some embodiments, the device type is a personal digital assistant. In other embodiments, the device type is a cellular telephone. In other embodiments, the device type is a laptop computer. In other embodiments, the device type is a desktop computer. In other embodiments, the device type is an Internet kiosk.

In some embodiments, the digital watermark includes data embedding. In some embodiments, the watermark comprises a pattern of data inserted into a file to provide source information about the file. In other embodiments, the watermark comprises data hashing files to provide tamper detection. In other embodiments, the watermark provides copyright information about the file.

In some embodiments, the network connection information pertains to bandwidth capabilities. In other embodiments, the network connection information pertains to Internet Protocol address. In still other embodiments, the network connection information consists of an Internet Protocol address. In one embodiment, the network connection information comprises a network zone identifying the logon agent to which the client 102 provided authentication credentials.

In some embodiments, the authorization credentials include a number of types of authentication information, including without limitation, user names, client names, client addresses, passwords, PINs, voice samples, one-time passcodes, biometric data, digital certificates, tickets, etc. and combinations thereof. After receiving the gathered information 612, the policy engine 236 makes an access control decision based on the received information 612.

Figure 6B:
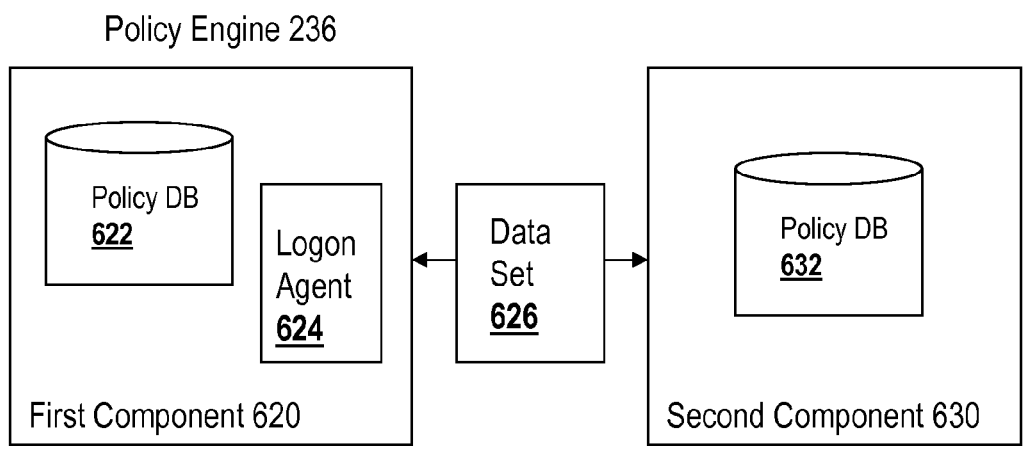
FIG. 6B is a block diagram depicting a more detailed embodiment of a policy engine.

Referring now to FIG. 6B, a block diagram depicts one embodiment of a policy engine 236, including a first component 620 comprising a condition database 622 and a logon agent 624, and including a second component 630 comprising a policy database 632. The first component 620 applies a condition from the condition database 622 to information received about client 102 and determines whether the received information satisfies the condition.

In some embodiments, a condition may require that the client 102 execute a particular operating system to satisfy the condition. In some embodiments, a condition may require that the client 102 execute a particular operating system patch to satisfy the condition. In still other embodiments, a condition may require that the client 102 provide a MAC address for each installed network card to satisfy the condition. In some embodiments, a condition may require that the client 102 indicate membership in a particular Active Directory to satisfy the condition. In another embodiment, a condition may require that the client 102 execute a virus scanner to satisfy the condition. In other embodiments, a condition may require that the client 102 execute a personal firewall to satisfy the condition. In some embodiments, a condition may require that the client 102 comprise a particular device type to satisfy the condition. In other embodiments, a condition may require that the client 102 establish a particular type of network connection to satisfy the condition.

If the received information satisfies a condition, the first component 620 stores an identifier for that condition in a data set 626. In one embodiment, the received information satisfies a condition if the information makes the condition true. For example, a condition may require that a particular operating system be installed. If the client 102 has that operating system, the condition is true and satisfied. In another embodiment, the received information satisfies a condition if the information makes the condition false. For example, a condition may address whether spyware exists on the client 102. If the client 102 does not contain spyware, the condition is false and satisfied.

In some embodiments, the logon agent 624 resides outside of the policy engine 236. In other embodiments, the logon agent 624 resides on the policy engine 236. In one embodiment, the first component 620 includes a logon agent 624, which initiates the information gathering about client 102. In some embodiments, the logon agent 624 further comprises a data store. In these embodiments, the data store includes the conditions for which the collection agent may gather information. This data store is distinct from the condition database 622.

In some embodiments, the logon agent 624 initiates information gathering by executing the collection agent 304. In other embodiments, the logon agent 624 initiates information gathering by transmitting the collection agent 304 to the client 102 for execution on the client 102. In still other embodiments, the logon agent 624 initiates additional information gathering after receiving information 612. In one embodiment, the logon agent 624 also receives the information 612. In this embodiment, the logon agent 624 generates the data set 626 based upon the received information 612. In some embodiments, the logon agent 624 generates the data set 626 by applying a condition from the database 622 to the information received from the collection agent 304.

In another embodiment, the first component 620 includes a plurality of logon agents 624. In this embodiment, at least one of the plurality of logon agents 624 resides on each network domain from which a client 102 may transmit a resource request. In this embodiment, the client 102 transmits the resource request to a particular logon agent 624. In some embodiments, the logon agent 624 transmits to the policy engine 236 the network domain from which the client 102 accessed the logon agent 624. In one embodiment, the network domain from which the client 102 accesses a logon agent 624 is referred to as the network zone of the client 102.

The condition database 622 stores the conditions that the first component 620 applies to received information. The policy database 632 stores the policies that the second component 630 applies to the received data set 626. In some embodiments, the condition database 622 and the policy database 632 store data in an ODBC-compliant database. For example, the condition database 622 and the policy database 632 may be provided as an ORACLE database, manufactured by Oracle Corporation of Redwood Shores, Calif. In other embodiments, the condition database 622 and the policy database 632 can be a Microsoft ACCESS database or a Microsoft SQL server database, manufactured by Microsoft Corporation of Redmond, Wash.

After the first component 620 applies the received information to each condition in the condition database 622, the first component transmits the data set 626 to second component 630. In one embodiment, the first component 620 transmits only the data set 626 to the second component 630. Therefore, in this embodiment, the second component 630 does not receive information 612, only identifiers for satisfied conditions. The second component 630 receives the data set 626 and makes an access control decision by applying a policy from the policy database 632 based upon the conditions identified within data set 626.

In one embodiment, policy database 632 stores the policies applied to the received information 612. In one embodiment, the policies stored in the policy database 632 are specified at least in part by the system administrator. In another embodiment, a user specifies at least some of the policies stored in the policy database 632. The user-specified policy or policies are stored as preferences. The policy database 632 can be stored in volatile or non-volatile memory or, for example, distributed through multiple servers.

In one embodiment, a policy allows access to a resource only if one or more conditions are satisfied. In another embodiment, a policy allows access to a resource but prohibits transmission of the resource to the client 102. Another policy might make connection contingent on the client 102 that requests access being within a secure network. In some embodiments, the resource is an application program and the client 102 has requested execution of the application program. In one of these embodiments, a policy may allow execution of the application program on the client 102. In another of these embodiments, a policy may enable the client 102 to receive a stream of files comprising the application program. In this embodiment, the stream of files may be stored and executed in an isolation environment. In still another of these embodiments, a policy may allow only execution of the application program on a server 106, such as an application server, and require the server 106 to transmit application-output data to the client 102.

Figure 6C:
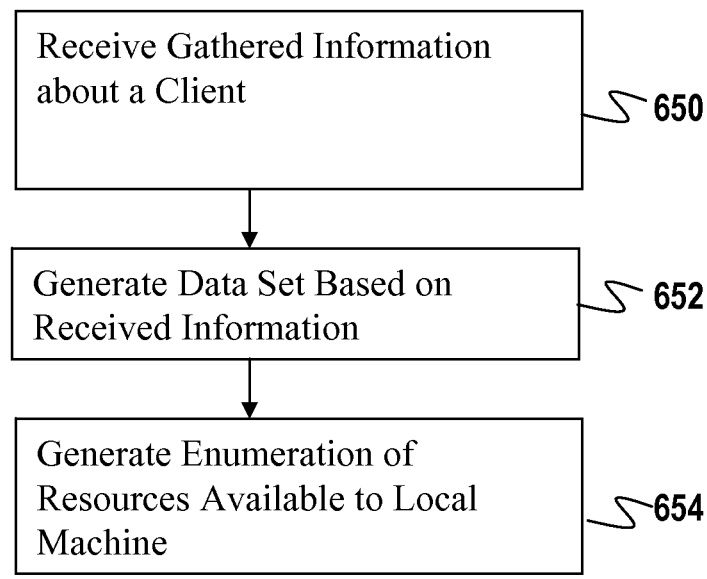
FIG. 6C a flow diagram depicting one embodiment of the steps taken by a policy engine to make an access control decision based upon information received about a local machine.

Referring now to FIG. 6C, a flow diagram depicts one embodiment of the steps taken by the policy engine 236 to make an access control decision based upon information received about a client 102. Upon receiving gathered information about the client 102 (Step 650), the policy engine 236 generates a data set based upon the information (Step 652). The data set 626 contains identifiers for each condition satisfied by the received information 612. The policy engine 236 applies a policy to each identified condition within the data set 626. That application yields an enumeration of resources which the client 102 may access (Step 654). The policy engine 236 then presents that enumeration to the client 102. In some embodiments, the policy engine 236 creates a Hypertext Markup Language (HTML) document used to present the enumeration to the client.

In some embodiments, a determination is made as to a type of connection to establish when granting access to a resource responsive to a determination by a policy engine such as the policy engine 236 described above in FIG. 6A, FIG. 6B and FIG. 6C. In other embodiments, a determination is made as to a method for granting access to a resource, such as a method for execution, responsive to a determination by a policy engine such as the policy engine 236 described above in FIG. 6A, FIG. 6B and FIG. 6C. In other embodiments, the server 106 or appliance 200 receiving the credentials and the request to execute the enumerated application further comprises such a policy engine 236.

In one embodiment, one of a plurality of types of access is identified, responsive to a policy, each of the plurality of types of access associated with at least one connection characteristic. In one embodiment, the identification is made responsive to an application of a policy to the received credentials associated with the client 102. In some embodiments, the selection is made by a policy engine such as the policy engine 236 described above in FIG. 6A, FIG. 6B and FIG. 6C. In other embodiments, the server 106 or appliance 200 receiving the credentials and the request to execute the enumerated application further comprises such a policy engine 236.

In some embodiments, after a server 106 or appliance 200 authorizes access to a resource, a client 102 performs a pre-launch analysis of the client 102. In one of these embodiments, the client 102 performs the pre-launch analysis to confirm authorization to access a resource, or to complete the authorization process. In other embodiments, the client 102 performs a pre-launch analysis of the client 102 prior to the authorization decision. In still other embodiments, the client 102 performs a pre-launch analysis of the client 102 after receiving authorization to access a resource but prior to the establishment of a connection to the resource. In one of these embodiments, the client 102 performs a pre-launch analysis of the client 102 after receiving authorization to access a resource but prior to an identification of a type of connection authorized for use in accessing the resource.

In one embodiment, the client 102 performs the pre-launch analysis prior to retrieving and executing a resource, such as a plurality of application files comprising an application program. In another embodiment, the client 102 performs the pre-launch analysis responsive to a received indication that the pre-launch analysis is a requirement for authorization to access a resource, such as the plurality of application files comprising an application program. In still another embodiment, the client 102 retrieves at least one characteristic required for execution of an application program. In yet another embodiment, the client 102 receives access information indicating a location of a file for retrieval by the client 102, the file enumerating the at least one characteristic. In some embodiments, the client 102 performs the pre-launch analysis after a server 106 or appliance 200 selects a method of providing access to a resource and identifying a type of connection to establish between the client and the resource.

The client 102 determines the existence of the at least one characteristic on the client 102. In some embodiments, the client 102 makes this determination as part of the pre-launch analysis. In one embodiment, determining the existence of the at least one characteristic on the client 102 includes determining whether a device driver is installed on the client 102. In another embodiment, determining the existence of the at least one characteristic on the client 102 includes determining whether an operating system is installed on the client 102. In still another embodiment, determining the existence of the at least one characteristic on the client 102 includes determining whether a particular operating system is installed on the client 102. In yet another embodiment, determining the existence of the at least one characteristic on the client 102 includes determining whether a particular revision level of an operating system is installed on the client 102.

In some embodiments, determining the existence of the at least one characteristic on the client 102 includes determining whether the client 102 has acquired authorization to execute an enumerated application. In one of these embodiments, a determination is made by the client 102 as to whether the client 102 has received a license to execute the enumerated application. In another of these embodiments, a determination is made by the client 102 as to whether the client 102 has received a license to receive across an application streaming session a plurality of application files comprising the enumerated application. In other embodiments, determining the existence of the at least one characteristic on the client 102 includes determining whether the client 102 has sufficient bandwidth available to retrieve and execute an enumerated application.

In some embodiments, determining the existence of the at least one characteristic on the client 102 includes execution of a script on the client 102. In other embodiments, determining the existence of the at least one characteristic on the client 102 includes installation of software on the client 102. In still other embodiments, determining the existence of the at least one characteristic on the client 102 includes modification of a registry on the client 102. In yet other embodiments, determining the existence of the at least one characteristic on the client 102 includes transmission of a collection agent 304 to the client 102 for execution on the client 102 to gather credentials associated with the client 102.

In some embodiments, the client 102 makes a request for authorization to execute an application responsive to a determination that at least one characteristic exists on the client 102. In one of these embodiments, the client 102 determines that a plurality of characteristics exist on the client 102, the plurality of characteristics associated with an enumerated application and received responsive to a request to execute the enumerated application. In another of these embodiments, whether the client 102 receives authorization for execution of the enumerated application files depends upon existence of the at least one characteristic on the client 102. In one embodiment, the client 102 received an enumeration of application programs, requested execution of an enumerated application, and received access information including the at least one characteristic and a launch ticket authorizing the execution of the enumerated application upon the determination of the existence of the at least one characteristic on the client 102. In some embodiments, the client 102 executes a second client agent 120', the second client agent 120' requesting execution of an application on a server 106, responsive to a determination that the client 102 lacks the at least one characteristic.

Figure 7:
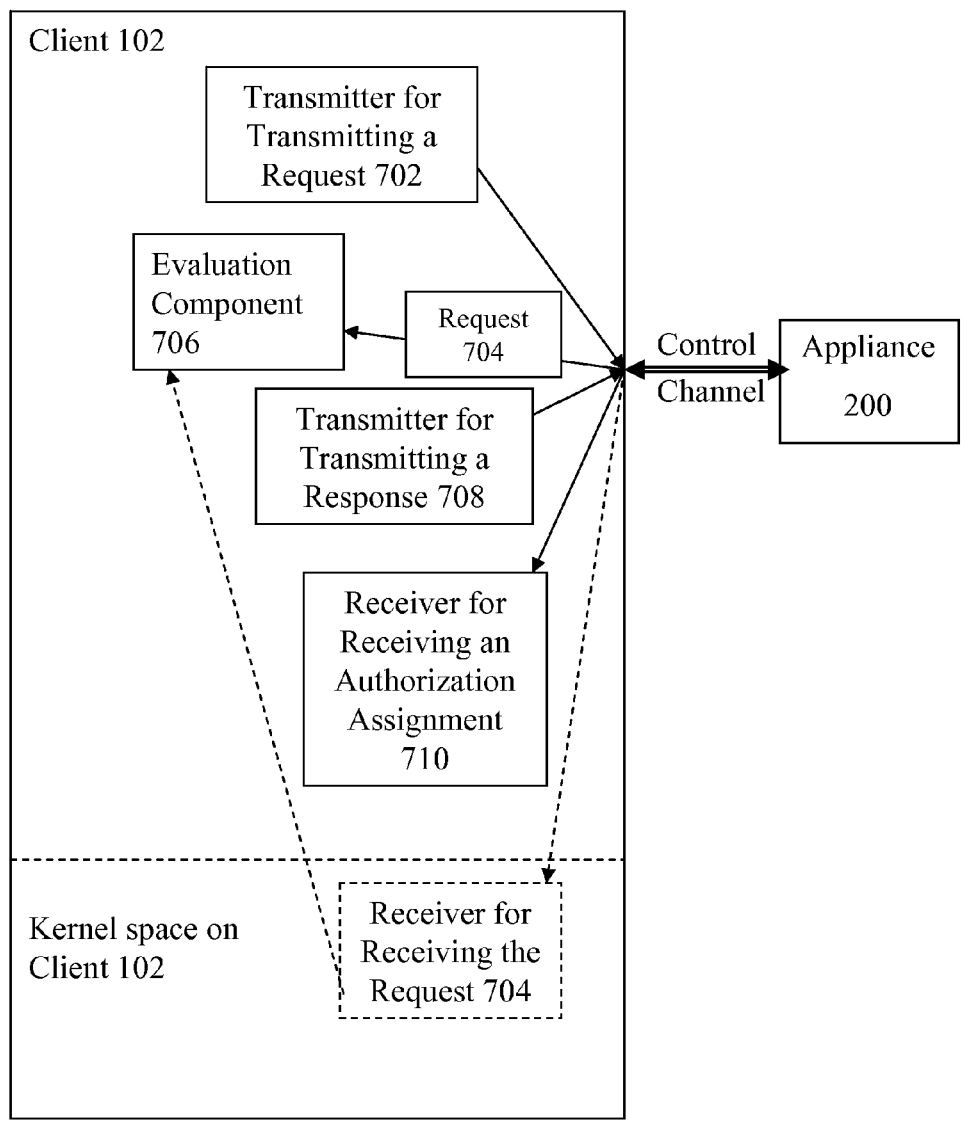
FIG. 7 is a flow diagram depicting an embodiment of steps taken in a method for authorizing a level of access of a client to a virtual private network connection based on a client-side attribute.

Referring now to FIG. 7, a block diagram depicts one embodiment of a system for authorizing a level of access of a client to a virtual private network connection based on a client-side attribute. In brief overview, the system includes a client 102, a means for transmitting a request 702, a request 704, an evaluation component 706, a means for transmitting a response 708, a means for receiving an authorization assignment 710, and an appliance 200.

The means for transmitting a request 702 transmits from the client 102 to the appliance 200 the request for a virtual private network connection to a network. In one embodiment, the means for transmitting a request 702 comprises a transmitter. In another embodiment, the means for transmitting a request 702 resides in the client agent 120. In one embodiment, the means for transmitting a request 702 transmits a request for access to a resource, such as an application or server 106, residing on the network. In another embodiment, the means for transmitting a request 702 transmits a request for a network address on the virtual private network. In still another embodiment, the means for transmitting a request 702 transmits the request for the virtual private network connection after authenticating the client 102 to the appliance 200. In yet another embodiment, the means for transmitting a request 702 transmits the request prior to the establishment of a control connection. In a further embodiment, the appliance 200 establishes the control connection responsive to receiving the request from the client 102.

The request 704 is received by the client 102, via a control connection between the client 102 and the appliance 200, for evaluation of at least one clause of a security string, the at least one clause identifying an object for evaluation, an attribute of the object, and a pre-requisite associated with the attribute. In one embodiment, the request 704 includes at least one clause of a security string, the at least one clause identifying the client as an object for evaluation. In another embodiment, the request 704 includes at least one clause of a security string, the at least one clause identifying a presence of an application program on the client as an attribute of the object. In still another embodiment, the request 704 includes at least one clause of a security string, the at least one clause identifying an absence of an application program on the client as an attribute of the object. In yet another embodiment, the request 704 includes at least one clause of a security string, the at least one clause identifying a presence of a version of an application program on the client as an attribute of the object.

In one embodiment, the request 704 includes at least one clause of a security string, the at least one clause identifying an absence of a version of an application program on the client as an attribute of the object. In another embodiment, the request 704 includes at least one clause of a security string, the at least one clause identifying a presence of a required version of an application program on the client as a pre-requisite. In still another embodiment, the request includes at least one clause of a security string, the at least one clause identifying a presence of an application program on the client as a pre-requisite. In yet another embodiment, the request includes at least one clause of a security string, the at least one clause identifying an absence of an application program on the client as a pre-requisite. In some embodiments, the request 704 is sent to the client 102 over the control connection in response to a request by the client for access to a resource or initiation of a connection.

In some embodiments, the kernel on the client 102 receives a security string. In one of these embodiments, the kernel identifies one or more atomic expressions within the security string. In another of these embodiments, the atomic expressions within the security string are separated by logical operators. The logical operators may be expressed by, for example, double ampersands indicating that the expressions are conjunctive or double slashes indicating that the expressions are disjunctive. In still another of these embodiments, the at least one clause of the security string is an atomic expression within the security string separated from other expressions in the security string by logical operators. In other embodiments, and as shown in shadow in FIG. 7, the kernel on the client 102 comprises receiver for receiving the request 704 from the appliance 200 over the control channel. In one of these embodiments, the kernel transmits all or part of the request to the evaluation component 706.

In one embodiment, a user of an appliance 200 generates the security string. In another embodiment, the appliance 200 adds a generated security string as a policy. In still another embodiment, the appliance 200 adds a generated security string as a policy within an authorization server, a policy engine, a firewall, a virtual private network server, or other security appliance. In some embodiments, the appliance 200 transmits the generated security string to the client 102 in its entirety and without re-formatting from the form in which the security string was generated. In other embodiments, the appliance 200 transmits only portions of the security string to the client 102, such as one clause or atomic expression at a time. In still other embodiments, the appliance 200 transmits the generated security string to a kernel on the client 102 for formatting and parsing into atomic expressions.

In one embodiment, a security string is associated with an authorization group. In another embodiment, if a client 102 satisfies a requirement expressed by the security string, the client 102 is assigned to the authorization group. In still another embodiment, if a client 102 fails to satisfy a requirement expressed by the security string, the client 102 is assigned to the authorization group. In some embodiments, if no security string is assigned to an authorization group, the client 102 request is granted without the need for evaluation of a security string. In other embodiments, if no authorization group is assigned to a security string, but evaluation of the security string is required by the appliance 200, the client 102 request is denied.

In one embodiment, a security string is an expression of a policy. In another embodiment, and as an example, if a policy requires a client 102 to execute a particular personal firewall program or a particular antivirus program before accessing a resource or a establishing a type of connection, and if the policy assigns the client to a particular authorization group if the client fails to satisfy the policy, a security string expressing the policy may be of the form: "pf_1_ZoneAlarm_ 4.0.012.013||pf_1_TrendMicro_11.0.0"—clientsecurity- AuthGroup ag2." In still another embodiment, and as a second example, a policy may require a particular revision level of an antivirus program and a particular process running, and if the policy assigns the client to a particular authorization group if the client fails to satisfy the policy, a security string expressing the policy may be of the form: "av_0_mcafeevi- russcan_4.88 && svc_0_svchost"-clientsecurityAuth- Group ag1."

In some embodiments, a priority level may be assigned to the security string. In one of these embodiments, the appliance 200 may transmit the security string having the highest priority to the client 102. In another of these embodiments, and as an example, if the appliance 200 identifies the following two security strings:

--- sa1 -clientsecurity "av_0_mcafeevirusscan_4.88 && svc_0_svchost" - cliensecurityAuthGroup ag1
sa2 -clientsecurity
"pf_1_ZoneAlarm_4.0.012.013 || pf_1_TrendMicro_11.0.0" - clientsecurityAuthGroup ag2,

--- the appliance 200 may select the higher priority security string (sa1) over the lower priority string (sa2). In still another of these embodiments, when a client 102 connects to a vServer 275 on the appliance 200, the appliance 200 evaluates applicable security strings and identifies the security string to transmit to the client 102.

In other embodiments, a security string may be expressed in the form "object.attribute.prerequisite." In one of these embodiments, and for example, the security string may be an expression identifying the client 102, a particular application program associated with the client 102 and a prerequisite associated with the program, the expression having the following form:

--- client.application[mcafeevirusscan].version >= 4.88 && client.svc[svchost]RUNNING

---

In this embodiment, the object is the client 102 (client), the attribute is an antivirus program (application[mcafeevirusscan]), and the pre-requisite is that the application be of at least a particular version level (version>=4.88). In this embodiment, the security string comprises two clauses and the second clause identifies the client 102, a process on the client (a service called svchost), and a pre-requisite associated with the process (that the svchost process be executing, or running, on the client). In this embodiment, the double ampersand indicates that the client must satisfy both of the clauses to satisfy the security string.

In another of these embodiments, and as a second example, the security string may comprise an expression having two disjunctive clauses in which the client 102 may satisfy one clause or the other to satisfy the security string. In one example of this embodiment, the expression may be of the following form:

--- client.application.pf[ZoneAlarm].version >= 4.0.012.013 || client.application.pf[TrendMicro].version >= 11.0.0.

---

In this embodiment, the client 102 will satisfy the security string if the client 102 executes a particular level of a particular personal firewall (ZoneAlarm version 4.0.012.013 or greater) or if the client 102 executes a particular level of a particular antivirus program (TrendMicro version 11.0.0 or greater).

The evaluation component 706 resides on the client 102, identifies the attribute, determines whether the attribute satisfies the pre-requisite, and evaluates the at least one clause. In some embodiments, the evaluation component 706 resides in the client agent 120. In other embodiments, the kernel of the client 102 provides the functionality of the evaluation component 706. In still other embodiments, the kernel of the client 102 validates a response provided by the evaluation component 706.

In one embodiment, the evaluation component 706 executes a script to evaluate the at least one clause. In another embodiment, the evaluation component 706 is transmitted to the client 102 from the appliance 200. In still another embodiment, the evaluation component 706 is a collection agent, such as a collection agent 304 described above in connection with FIGS. 4A, 4B, and 4C, the collection agent gathering information associated with the attribute. In yet another embodiment, the evaluation component 706 evaluates the at least one clause responsive to the information gathered about the client 102.

In some embodiments, the evaluation component 706 identifies attributes of the client 102. In one of these embodiments, the attributes include, but are not limited to, any of the following: client operating system, presence of service packs, presence of hot fixes on the client, executing services, executing processes, presence of certain files, antivirus software, personal firewall software, anti-spam software, internet security software, and registry configuration. In another of these embodiments, the attributes of the client 102 include information associated with the client, such as the information described in connection with the collection agent 304, described above in connection with FIG. 6A and FIG. 6B. In still another of these embodiments, the attributes of the client 102 include information associated with the client and gathered as part of a pre-launch analysis, as described above.

In one embodiment, the evaluation component 706 identifies an attribute indicating a presence on the client of one of the following: a version of an operating system, a service pack of the operating system, a running service, a running process, and a file. In another embodiment, the evaluation component 706 identifies an attribute indicating a presence on the client of one of the following: antivirus software, personal firewall software, anti-spam software, and internet security software. In still another embodiment, the evaluation component 706 identifies an attribute identifying a version of one of the following: antivirus software, personal firewall software, anti-spam software, and internet security software. In yet another embodiment, the evaluation component 706 determines that the attribute satisfies the pre-requisite responsive to the identification of the attribute.

In some embodiments, as described above, the client 102 performs the pre-launch analysis after a server 106 or appliance 200 selects a method of providing access to a resource and identifying a type of connection to establish between the client and the resource. In other embodiments, the client 102 performs a pre-launch analysis of the client 102 prior to an authorization decision by the appliance 200. In other embodiments, the client 102 performs a pre-launch analysis of the client 102 after receiving authorization to access a resource but prior to the establishment of a connection to the resource. In one of these embodiments, the client 102 performs a pre-launch analysis of the client 102 after receiving authorization to access a resource but prior to an identification of a type of connection authorized for use in accessing the resource.

In some embodiments depicted by FIG. 6A and FIG. 6B, the client 102 performs a pre-launch analysis prior to the identification of a type of connection to establish between the client and the resource. In one of these embodiments, the client 102 transmits a result of the pre-launch analysis to the appliance 200. In another of these embodiments, the appliance 200 makes an access control decision, including an identification of a type of connection to establish between the client 102 and a requested resource, responsive to a received result of a pre-launch analysis. In other embodiments, the client 102 evaluates a security string as part of a pre-launch analysis. In still other embodiments, the client 102 transmits a result of a pre-launch analysis to a kernel on the client 102. In yet other embodiments, the kernel evaluates a security string responsive to a received result of the pre-launch analysis.

In some embodiments, the kernel on the client 102 receives the security string. In one of these embodiments, the kernel identifies a plurality of clauses in the security string, the clauses separated by logical operators. In another of these embodiments, the clauses within the string are atomic expressions. In still another of these embodiments, the kernel transmits at least one clause to the evaluation component 706 for evaluation, the at least one clause comprising an atomic expression. In yet another of these embodiments, the evaluation component 706 transmits a result of evaluating the atomic expression to the kernel.

In other embodiments, the kernel on the client 102 receives a result of an evaluation of at least one clause in the security string from the evaluation component 706. In one of these embodiments, the kernel on the client 102 evaluates a security string comprising a plurality of clauses responsive to receiving a plurality of results from the evaluation component 706. In another of these embodiments, the kernel on the client 102 comprises the means for transmitting a response 708. In still another of these embodiments, the kernel on the client 102 transmits a result of an evaluation of an entire security string, comprising a plurality of clauses, to the appliance 200.

The means for transmitting a response 708 transmits from the client 102 to the appliance 200, via the control connection, a response comprising a result of the evaluation of the at least one clause by the evaluation component 706. In one embodiment, the means for transmitting a response 708 transmits a packet to the appliance 200 with the result of the evaluation. In another embodiment, the means for transmitting a response 708 transmits a "1" if the client satisfies the at least one clause or a "0" if the client does not satisfy the at least one clause. In some embodiments, the means for transmitting a response 708 resides on the evaluation component 706. In other embodiments, the means for transmitting a response 708 resides in the client agent 120. In still other embodiments, the means for transmitting a response 708 comprises a transmitter residing in the client agent 120 and sending packets over the control channel.

The means for receiving an authorization assignment 710 receives from the appliance 200 at the client 102 an assignment to an authorization group, the assignment determined based on the evaluation of the at least one clause. In one embodiment, the means for receiving the authorization assignment 710 receives an assignment made responsive to the result of evaluation of a second clause by the appliance 200. In another embodiment, the means for receiving the authorization assignment 710 receives an assignment made responsive to a determination by the appliance 200 that the client 102 lacks a desired attribute. In still another embodiment, the means for receiving the authorization assignment 710 receives an assignment to an authorization group providing quarantined access to the network via the appliance 200.

In some embodiments, the means for receiving an authorization assignment 710 comprises a component residing in the client agent 120. In other embodiments, the means for receiving an authorization assignment 710 resides in a kernel on the client 102. In still other embodiments, the means for receiving an authorization assignment 710 comprises a receiver in communication with the appliance 200.

In some embodiments, an authorization group to which a user of a client 102 belongs is identified by an evaluation of the client 102 and of attributes of the client 102. In one of these embodiments, a user of a client 102 requesting access to a network or other resource, or requesting a connection to a network or a resource on the network, is a member of a group of users, each member in the group authorized to access particular resources via particular types of connections. In another of these embodiments, a user of a client 102 belongs to a default authorization group. In still another of these embodiments, the appliance 200 evaluates the client 102 and determines that although the user of the client 102 is a member of a particular authorization group, the user does not currently satisfy the requirements for membership in the group, and is therefore not authorized to access the resources that the user is typically authorized to use. Alternatively, the appliance 200 may evaluate the client 102 and determine that although the user is not authorized to access particular resources via one type of connection, the client 102 may connect via a different type of connection. In yet another embodiment, the appliance 200 may evaluate the client 102 and determine that although the user is not authorized to access a particular set of resources, the client 102 may access a subset of those resources via a particular type of connection, such as via a secure connection to a quarantined network. In some embodiments, an authorization group may be created for the user of the client 102 upon the evaluation of the attributes of the client 102. In other embodiments, the client 102 satisfies the requirements of the applicable security strings and a connection is established according to the rules or policies of the client 102's default authorization group.

In one embodiment, the means for receiving the authorization assignment 710 receives a denial, from the appliance 200, of the client request if the security string is not associated with an authorization group. In another embodiment, the means for receiving the authorization assignment 710 receives a denial, from the appliance 200, of the client request if a pre-requisite in the security string is not satisfied. In still another embodiment, the means for receiving the authorization assignment 710 receives an assignment made responsive an evaluation, by the appliance 200, of a second clause of the security string comprising one or more logical operations.

Figure 8:
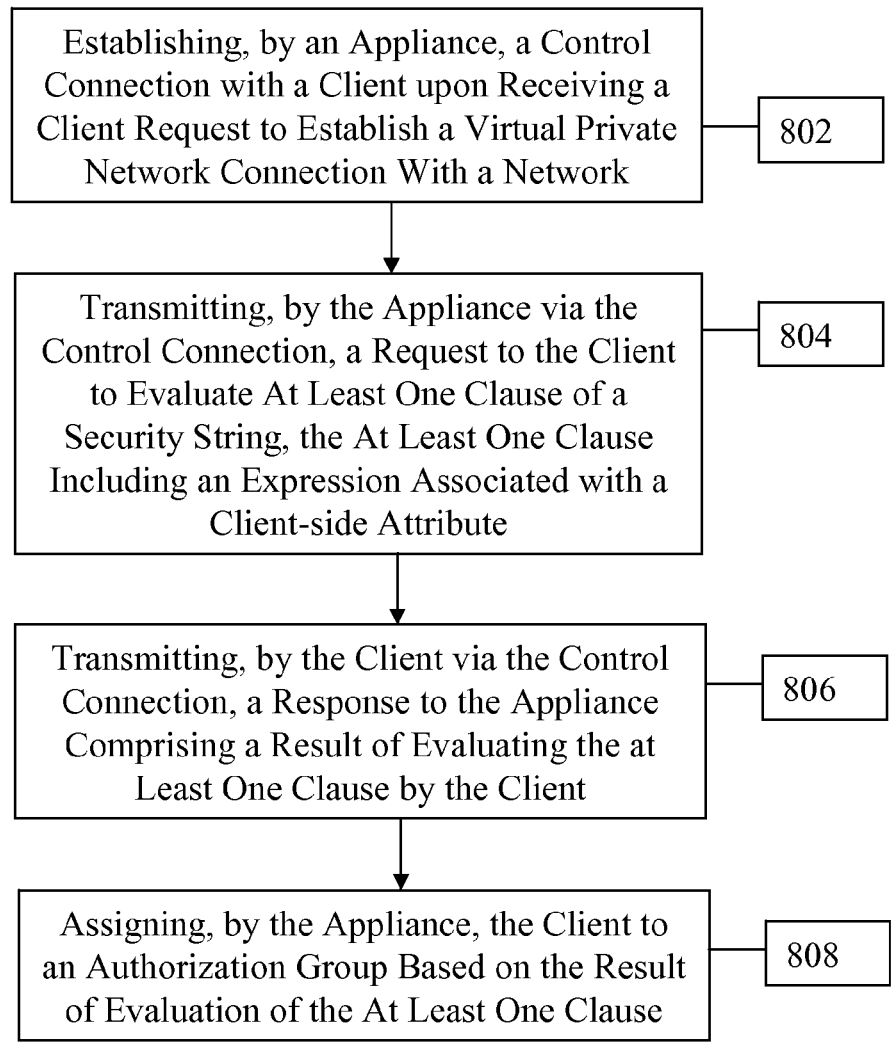
FIG. 8 is a block diagram depicting an embodiment of a system for authorizing a level of access of a client to a virtual private network connection based on a client-side attribute.

Referring now to FIG. 8, a flow diagram depicts one embodiment of the steps taken in a method for authorizing a level of access of a client to a virtual private network connection based on a client-side attribute. In brief overview, an appliance establishes a control connection with a client upon receiving a client request to establish a virtual private network connection with a network (step 802). The appliance transmits, via the control connection, a request to the client to evaluate at least one clause of a security string, the at least one clause including an expression associated with a client-side attribute (step 804). The client transmits, via the control connection, a response to the appliance comprising a result of evaluating the at least one clause by the client (step 806). The appliance assigns the client to an authorization group based on the result of evaluation of the at least one clause (step 808).

Referring now to FIG. 8, and in greater detail, an appliance establishes a control connection with a client upon receiving a client request to establish a virtual private network connection with a network (step 802). In one embodiment, the appliance receives a request from the client to access a resource on a network, such as a file or application. In another embodiment, the appliance receives a request from the client to access a server 106. In still another embodiment, the appliance receives a request for an association between the client and a network address associated with the virtual private network. In yet another embodiment, the client initiates establishment of the control connection. In some embodiments, the appliance is an appliance 200 as described above.

The appliance transmits, via the control connection, a request to the client to evaluate at least one clause of a security string, the at least one clause including an expression associated with a client-side attribute (step 804). In one embodiment, the appliance transmits the request to a collection agent on the client, such as a collection agent 304 described above, the collection agent gathering information associated with the client-side attribute and evaluating the at least one clause. In another embodiment, the appliance transmits a script to the client for execution. In still another embodiment, the appliance transmits a collection agent to the client, the collection agent evaluating the at least one clause.

The client transmits, via the control connection, a response to the appliance comprising a result of evaluating the at least one clause by the client (step 806). In one embodiment, the client evaluates the at least one clause. In another embodiment, a collection agent or evaluation component on the client evaluates the at least one clause. In still another embodiment, the client evaluates the at least one clause by executing a script. In yet another embodiment, the client gathers information associated with the client-side attribute. In a further embodiment, the client evaluates the at least one clause responsive to the gathered information.

In one embodiment, the client identifies a client-side attribute indicating a presence on the client of one of the following: a version of an operating system, a service pack of the operating system, a running service, a running process, and a file. In another embodiment, the client identifies a client-side attribute indicating a presence on the client of one of the following: antivirus software, personal firewall software, anti-spam software, and internet security software. In still another embodiment, the client identifies a client-side attribute indicating a version on the client of one of the following: antivirus software, personal firewall software, anti-spam software, and internet security software.

In one embodiment, the appliance evaluates a second clause of the security string. In another embodiment, the appliance evaluates a clause of the security string comprising one or more logical operations. In some embodiments, the appliance receives gathered information associated with the client. In one of these embodiments, the appliance receives the gathered information from a collection agent, such as a collection agent 304 executing on the client 102 as described above. In another of these embodiments, the appliance evaluates the second clause of the security string responsive to the gathered information.

The appliance assigns the client to an authorization group based on the result of evaluation of the at least one clause (step 808). In one embodiment, the appliance determines that the client lacks a desired client-side attribute, responsive to the result of the evaluation of the at least one clause. In another embodiment, the appliance assigns the client to an authorization group providing quarantined access to the network via the appliance. In still another embodiment, the appliance configures an authorization policy comprising the security string. In yet another embodiment, the appliance assigns the authorization policy to the authorization group.

In one embodiment, the appliance denies a login request from a client if the security string is not associated with the authorization group. In another embodiment, the appliance establishes a virtual private network connection with the client in accordance with the authorization group. In still another embodiment, the appliance establishes a virtual private network connection between the client and a server residing on a virtual private network.

In one embodiment, the appliance assigns the client to an authorization group based on an application of a policy to the result of evaluation of the at least one clause. In another embodiment, the appliance transmits the response comprising the result of the evaluation to a policy engine. In still another embodiment, the appliance assigns the client to an authorization group based on an application of a policy by the policy engine.

G. Appliance Failover Environment

Figure 9:
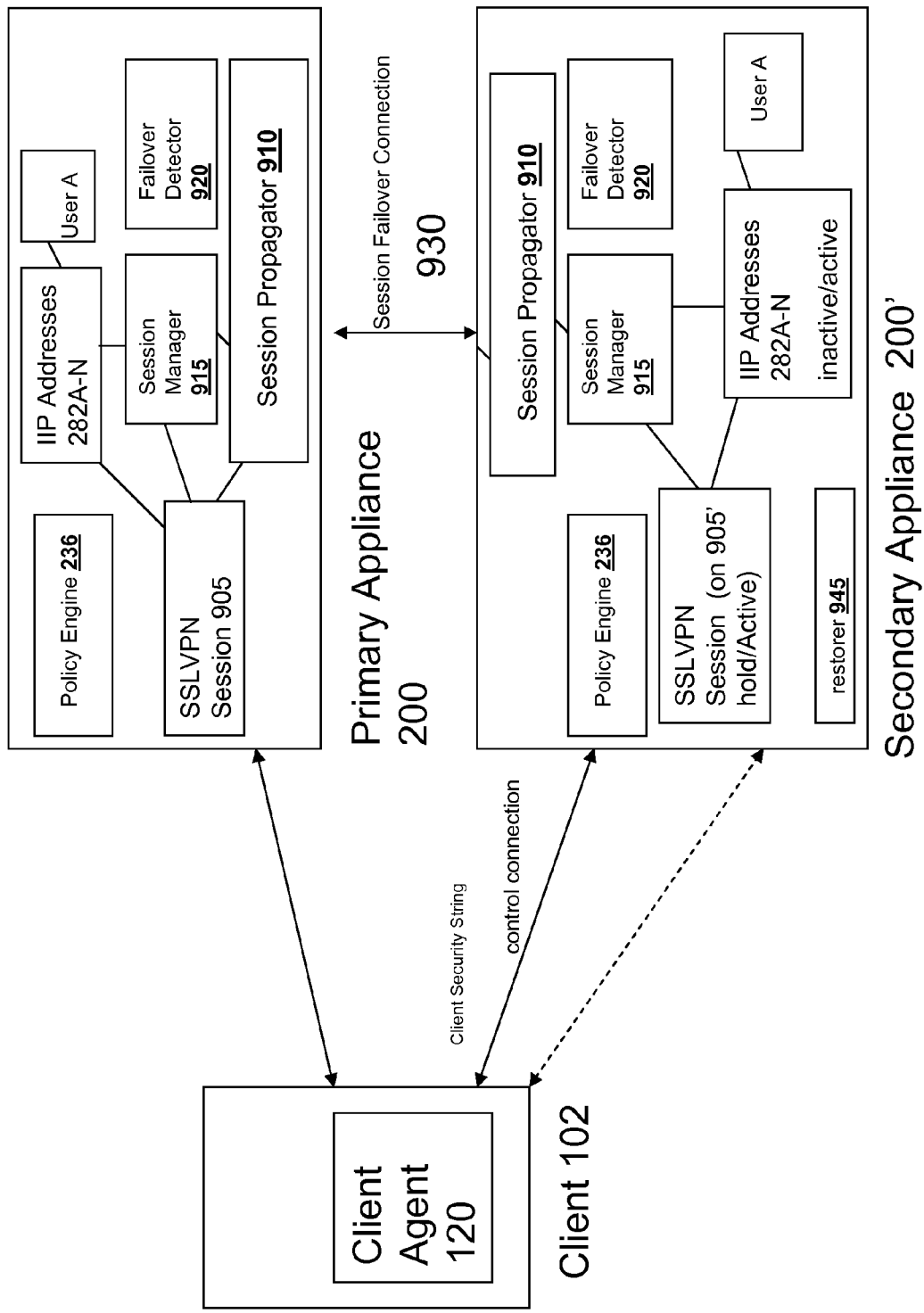
FIG. 9 is a block diagram depicting an embodiment of a session failover environment.

Referring now to FIG. 9, an embodiment of an environment for providing session failover between multiple appliances 200 is depicted. In brief overview, a first appliance 200, referred to as a primary appliance, may provide session connectivity between a client and a network 104, such as to a server, on behalf of a user. For example, the first appliance 200 may establish as SSL VPN session 905 between the client and a server. A second appliance 200' referred to as a secondary, backup or failover appliance acts as a failover or backup to the first appliance 200 for providing session connectivity for the client 102 to a network, or a server, such as via an SSL VPN session. Upon detection of failure of the primary appliance 200 in providing session connectivity or network access, the second appliance 200' becomes the primary appliance 200 to provide connectivity or access for the client via the session.

The primary appliance 200 sends, transmits, shares or otherwise provides information to the secondary appliance 200' via a connection or communication channel referred to as a session failover connection 930. The primary appliance 200 may communicate with the secondary appliance 200' using any type and form of protocol or protocols via the connection 930. In one embodiment, the primary appliance 200 makes RPC (remote procedure calls) via a TCP or UDP connection. In other embodiments, the primary appliance 200 and secondary appliance 200' may communicate using any type and form of custom or proprietary protocol. In some embodiments, the connection 930 includes a secure, tunneled, encrypted or virtual private network connection, and any type and form of protocols thereof. For the example, the connection 930 may include a VPN or SSL VPN connection. In yet another embodiment, the appliance 200 and 200' may communicate via a plurality of session failover connections 930. In other embodiments, the appliances may multiple a plurality of SSL VPN session information and communications via one or more connections 930.

The primary appliance 200 may establish the connection 930 with the secondary appliance 200' or the secondary appliance 200' may establish the connection 930 with the primary appliance 200. The connection 930 may be established at any time during operations of the appliances 200, 200'. In one embodiment, the appliances establish the connection 930 upon startup of either the primary or secondary appliance. In another embodiment, the appliances establish the connection 930 upon initiation or during the setup of a session. In some embodiments, the appliances establish the connection 930 in response to a command received from a user, system or application. For example, in one case, the appliances establish the connection response to configuration information received from a user. In another embodiment, the appliances establish the connection 930 in response to triggering or applications of one or more policies of a policy engine 236.

A session manager 915 may include any software, hardware or any combination of software and hardware. The session manager 915 may include any type and form of program, service, task, process or executable instructions operating in user mode 202, kernel mode 204 or any combination thereof in the appliance 200. In some embodiments, the session manager is a vServer 275, or a portion thereof, as depicted and described in conjunction with FIG. 2B. For example, a vServer 275 includes any logic, functions, rules, or operations to perform any embodiments of the session management techniques described herein, such as SSL VPN session management. In some embodiments, the session manager 915 provides or otherwise supports any of the SSL VPN functionality 280, and any embodiments thereof, described in connection with FIG. 2B above.

As also previously described herein in connection with FIG. 4, the appliance 200 may host one or more intranet internet protocol or intranetIP or IIP addresses 282A-282N. The appliance 200 may associate and assign these IIP addresses 282 with a user and/or client For example, when connected from a first network 104 to a second network 104' via the appliance 200, the appliance 200 establishes, assigns or otherwise provides an IntranetIP address for the user and/or client 102 on the second network 104'. The appliance 200 listens for and receives on the second or private network 104' for any communications directed towards the client 102 using the client's established IntranetIP 282. In one embodiment, the appliance 200 acts as or on behalf of the client 102 on the second private network 104. The appliance 200 may forward to the client 102 communications from the second network 104' directed towards the IIP address 282.

The appliance 200 and/or 200' may have a session propagator 910 including software, hardware or any combination of software and hardware. The session propagator 910 may include logic, functions, operations or executable instructions, such as a program, service or task to propagate a session or any information thereof between appliances. The session propagator 910 may transmit information of one or more sessions via the session failover connection. The information may include any data identify or specify any one or more of the following: 1) identifier for the session, 2) type of session, 3) configuration of session, 4) type or name of application for the session, 5) the computing devices participating in the session, such as network identifiers for the devices, 6) any IIP addresses for the session or users, such as IIP Pool 410, 7) IIP policies 420, 8) IPLWDB 450 (see FIG. 4), 9) any users associated with the session 10) any policies used for the session, such as names of SSL VPN policies, 11) any end point authorization policies, such as client security strings used for the session, 12) session state, and/or 13) any session metrics, such as length of the session.

In one embodiment, the primary appliance 200 propagates or synchronizes policies with the secondary appliance 200'. In some embodiments, the policy configuration of the primary appliance 200 is distributed and used in the secondary appliance 200'. In other embodiments, the primary and secondary appliances are configured with the same policies or with the same policies applicable to sessions to be handled via failover by the secondary appliance 200'. In another embodiment, the secondary appliance 200' maintains and uses one or more different policies on a failover session.

The session propagator 910 may propagate information for one or more sessions in any form, including one or more objects, data structures, or files. The appliance 200 and/or session propagator 910 may packetize any of this information into one or more network packets and payloads thereof in a manner in accordance with the protocols used between the appliances. In some embodiments, a first propagator 910 on a first appliance 200 communicate or interfaces to a second propagator 910 on a second appliance 200 to provide session information, such as information for the second appliance 200' to create, generate or otherwise establish the session 905 on the second appliance 200' as exists on the first appliance 200.

The session propagator 910 may propagate a session based on one or more policies. For example, in one embodiment, the policy engine 236 may have an SSL VPN session applied to a session that indicates the session is not have a failover or backup session. In some cases, a first set of one or more sessions may be propagated from one appliance to another appliance, while a second set of one or more sessions are not propagated between appliances.

The session propagator 910 may propagate a session from one appliance to another appliance synchronously or asynchronously. The session propagator 910 may propagate a session during a sequence of operations of establishing a session, such as an SSL VPN session, on the primary appliance 200. By way of example, the primary appliance 200 may received a request from a client to establish a connection with a server. In response, the appliance 200 creates a session 905 on the appliance 200. The primary appliance 200 may apply any policies to the session, such as any configured SSL VPN policies may be applied to the session. Upon creation or establishment of the session, the primary appliance 200 via the session propagator 910 propagates the session to the secondary appliance 200. The secondary appliance 200' may establish the second session via the session manager 915 and/or session propagator 910 of the secondary appliance 200'. This may be referred to as a failover or backup session.

In one embodiment, some portions or information of the session may change dynamically during the course of using the session or during the lifetime of the session. For example, the appliance 200 and/or session manager 915 may maintain counters for auditing and/or to maintain session statistics. These counters may change dynamically during operation or lifetime of the session. In some embodiments, the session propagator 915 propagates these dynamically changing session information upon the change in the session. In other embodiments, the session propagator 915 propagates session information, including changed session information, on a predetermined frequency or time period. In yet another embodiment, the session propagator 915 propagates session information, including changed session information, triggered by predetermined events. In some embodiments, a first propagator 910 such as a propagator on the secondary appliance 200' queries a second propagator 910 such as a propagator on the primary appliance 200 on a predetermined basis, such as frequency, time or event based.

Upon receipt of session information propagated from the primary appliance 200, the secondary appliance 200' may store this information in memory or to storage. In one embodiment, the secondary appliance 200' and/or session propagator 910 of the secondary appliance 200' may re-create or otherwise establish a session on the secondary appliance based on the session information received from the primary appliance 200. In some embodiments, the second appliance 200' creates or modifies a session to be a copy of the session on the first appliance. In one case, the secondary appliance 200' provides a session having the same session structure, information and/or configuration as the session on the primary appliance 200. In another embodiment, the secondary appliance 200' updates the session with information, such as dynamic or changed session information, received from the primary appliance 200.

The session manager 915 may identify, track, maintain, control and/or change a state of a session, such as any of the following states: active, inactive, disconnected, on hold/suspended, failed, error, backup, etc. In one embodiment, the session manager 915 may identify a session as in an active state. In another embodiment, the session manager 915 may identify or change a session from active to inactive. In some embodiments, the session manager 915 may identify a session as suspended or change the state of a session from active to suspended. In some embodiments, the session manager 915 may change the state of a session from suspended to active.

For example, the secondary appliance 200' may establish a failover session 905' for an active session 905 of the primary appliance 200. The session manager 915 of the secondary appliance 200' may identify or establish this failover session 905' as inactive or otherwise on hold or suspended. Upon detection of a failover in the primary appliance 200, the session manager 915 may change the status or state of the failover session from inactive or suspended to active. In one embodiment, the session manager 915 changes the state of the failover session to active upon authorization of the end point, e.g., the client 102, using the client security strings techniques described herein.

The appliance and/or session manager may control the establishment of a session, access via a session and/or the state of a session via any type and form of end point authentication and authorization schemes. In some embodiment, the appliance and/or session manager may perform any of the systems and methods of the client security string end point authorization techniques described above in connection with FIGS. 6A-6C, 7 and 8. For example, the appliance 200 may transmit a client security string to the client based on one or more polices. The client may evaluate the security string or portion thereof and transmit the evaluation results back to the appliance. Based on the evaluation results and/or one or more polices, the appliance 200 may authorized the client 102 to establish a session or to access a network, application or other resource via the session. In some embodiments and described in further detail below in conjunction with FIG. 11, a secondary appliance 200 may activate a failover session upon performing end-point scanning and authorization.

The appliance 200 and/or 200' may include a failover detector 920. The failover detector 920 may include software, hardware or any combination of software and hardware. The failover detector 920 may include logic, functions, operations or executable instructions, such as a program, service or task to determine a status of an appliance. The failover detector 920 may determine if an appliance is operational or running, or otherwise able to service a connection or session 905. The failover detector 920 may determine if a condition exists on an appliance 200, 200' such that the management and providing of the session 905 should be transferred from one appliance to another appliance, such as from the primary appliance 200 to the backup appliance 200'. In one embodiment, a failover detector 920 on appliance 200' determines the operational status or state of the primary appliance 200. In another embodiment, the failover detector 920 on appliance 200 determines the operational status or state of the second appliance 200'. In some embodiments, the failover detector 920 on one appliance 200 determines the operational status or state of the appliance 200 and forwards information on the operational status/state to a second appliance 200', such as to a second failover detector. In other embodiments, the failover detector 920 may be distributed among two or more appliances or on one or more other computing devices 100. In one embodiment, the client agent 120 includes a failover detector 920.

The failover detector 920 may use any type and form of protocol to determine a status of an appliance 200. In one embodiment, the failover detector 920 may send any type of ping or "heartbeat" message to an appliance to determine a status of the appliance. In another embodiment, the failover detector 920 may make an RPC call to determine a status of an appliance. In some embodiments, the failover detector 920 makes an application programming interface (API) call to determine the status of an appliance. In yet another embodiment, the failover detector obtains or gets status information of a appliance from a health monitoring program, such as the health monitoring program 216 described in conjunction with FIG. 2A.

The failover detector 920 may communicate to or interface with the session propagator 910 and/or session manager 915 to perform session failover upon detection of an appliance failure. In one embodiment, the failover detector 920 transmits a message to the session propagator 910 and/or session manager 915 to provide notice of a failover situation or condition. In another embodiment, the failover detector 920 triggers an event in the session propagator 910 and/or session manager 915 to provide notice of a failover situation or condition. In other embodiments, the failover detector 920 makes an API call to the session propagator 910 and/or session manager 915 to provide notice of a failover situation or condition.

Although a single second appliance 200 is depicted in FIG. 9, a plurality of secondary appliances 200' may be deployed. For example, a first secondary appliance 200' may be a failover appliance for a first primary appliance 200. A second secondary appliance 200" may be a backup or failover appliance to the first secondary appliance 200', and a third second appliance 200''' may be a failover appliance for the second secondary appliance 200", and so on. In these embodiments, one or more sessions may be propagated via a daisy chain of multiple failover appliances. Upon failover of the first primary appliance 200, the first secondary appliance 200 may become a primary appliance, such as a second primary appliance 200. Upon failover of this second primary appliance (or first secondary appliance, the third secondary appliance becomes a primary appliance for the session, and so on.

In other embodiments, a secondary appliance 200' may be a failover or backup appliance for multiple primary appliances, such as a first primary appliance and a second primary appliance. The first primary appliance and the second primary appliance may each propagate one or more session, such as SSL VPN session, to the secondary appliance 200'. In some embodiments, a primary appliance 200 may have multiple failover secondary appliances, such as redundant appliances. For example, a primary appliance 200 may propagate one or more session to a first secondary appliance 200' and a second secondary appliance 200". In yet another embodiment, a primary appliance 200 may propagate a first set of one or more sessions to a first secondary appliance 200' and a second set of one or more sessions to a second secondary appliance 200'.

The detection of failover, propagation of sessions, and/or the transfer of the active session from a primary appliance 200 to a secondary appliance 200' may occur seamlessly and/or transparently to the client or user, or the applications using the transferred session. In one embodiment, the client agent 120 is provided notice of the failover situation and communicates with the secondary appliance 200' instead of the primary appliance 200. In some embodiments, the client agent 120 re-establishes a connection and the session with the secondary appliance 200'. For example, upon the client detecting the connection to the primary appliance 200 has been lost, dropped or otherwise disconnected, the client agent 120 connects to the backup appliance 200'.

In other embodiments, the secondary appliance 200 after failover has the same network identifier or IP address as the primary appliance. In these embodiments, the client agent 120 may communicate to the same network identifier of an appliance but the secondary appliance 200' receives the communication instead of the primary appliance 200. In some embodiments, the primary appliance 200 intercepts communications between the client and a server. Upon detection of failover in these embodiments, the secondary appliance 200' intercepts the communications instead of the primary appliance 200.

The appliance 200, 200' may also include a restoration mechanism or restorer 945 for restoring or addressing any synchronization issues of a user's IIP address between appliances due to an error, failure or issue with session propagation. The restorer 945 may include software, hardware or any combination of software and hardware. The restorer 945 may be an application, program, library, service, process, task, thread or any other type and form of executable instructions. The restorer 945 may include recovery logic, function or operations to determine if an IIP address is not synchronized or if there was an error in propagation, and to update the appliance with the appropriate IIP addresses and states thereof. In one embodiment, the restorer 945 queries another appliance to obtain updated IIP address and state information for an entity, such as a user. In some embodiment, the restorer 945 uses any type and form of address resolution protocol (ARP), such as a gratuitous ARP, to resolve IIP address issues or conflicts.

H. Maintaining IIP Address Stickiness Via Failover

Figure 10A:
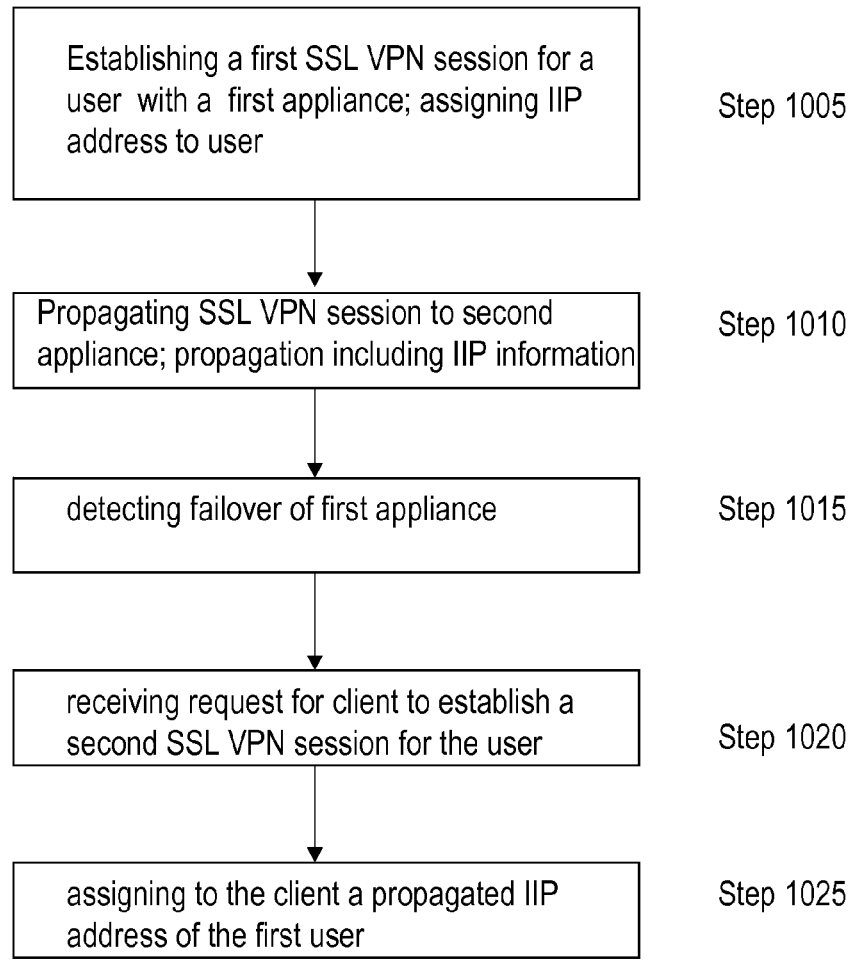
FIG. 10A is a flow diagram depicting steps of an embodiment of maintaining IIP addresses of a user via session failover.

Referring now to FIG. 10, an embodiment of steps of a method for maintaining IIP address stickiness during appliance failover of an SSL VPN session is depicted. Using the techniques discussed herein, one of the one or more IIP addresses assigned to a user and/or client in the primary appliance 200 may be used as the IIP address for the user and/or client after failover in the secondary appliance 200'. In this manner, although a failover condition occurred, the SSL VPN connection may seamlessly and/or transparently continue using the IIP address of the user and/or the client. In other situations, when a user connects via the secondary appliance 200', the user is assigned an IIP address that was assigned to the user via the primary appliance 200.

In brief overview of method 1000, at step 1005, an SSL VPN session is established for a user with a first or primary appliance 200. The appliance 200 assigns the user an IIP address for the session. At step 1010, the primary appliance propagates SSL VPN session to a secondary appliance 200'. The propagated information may include one or more IIP addresses 282 assigned to or associated with the user, such as a pool of IIP addresses 410 as depicted in and described with FIG. 4. The secondary appliance 200' may establish a failover session. At step 1015, a failover condition of the primary appliance 200 is detected. At step 1020, the secondary appliance 200 receives a request from a client to establish a second SSL VPN session for the user. At step 1025, the secondary appliance assigns to the user and/or client a propagated IIP address of the user.

In further details, at step 1005, an application or a user on the client 102 may request a SSL VPN connection from a first network 104 to a second network 104' such as to a server 106 on network 104. In one embodiment, the client agent 120 transmits a request to the appliance 200 to establish the SSL VPN session with the server 106. In some embodiments, the appliance 200 establishes a first transport layer connection with the client 102 via client 120. In response to the request, the appliance 200 may establish a second transport layer connection with the server 106. In one case, the appliance 200 provides an SSL VPN session to the client via the first transport layer connection. In some embodiments, the appliance 200 may already have an established connection with a server. For example, the appliance 200 may have one or more pooled transport layer connections to the server 106. In some cases, the client agent 120 transmits a configuration command, e.g., /cfg, to request and establish a SSL VPN session.

The appliance 200 may assign or otherwise provide the user identified with the SSL VPN session with an IIP address 282. The appliance 200 may use any of the systems and methods described herein to assign the IIP address, such as any of the embodiments described in conjunction with FIG. 4 and FIG. 5 above. The appliance 200 may assign an IIP address 282 to a user from a plurality of IIP addresses based on policy, temporal and/or status information. For example, the appliance 200 may assign to the SSL VPN session a most recently or most frequently used IIP address 282. The appliance 200, such as via session manager 915, maintains the state of the IIP addresses 282 used or assigned to the user. For example, the IIP address assigned to the user may be identified as in the active state. The appliance 200 may also track any temporal and client information associated with the user assigned IIP address.

Further to step 1005, the appliance 200 may associate, inherit or otherwise apply one or more policies to the SSL VPN session, such as via session manager 915. In one embodiment, the appliance 200 associates or inherits one or more policies with the SSL VPN session based on the configuration of the policy engine 236 at the time of the request and/or establishment. In another embodiments, the appliance associates or inherits one or more policies with the SSL VPN session based on executed policy or policy configuration commands upon the establishment of the SSL VPN session, or any time thereafter.

The appliance 200, such as via session manager 915, may store and maintain information on the established SSL VPN session in one or more objects, data structures tables and/or files. Some portions of the session information may be static. For example, the session information is stored upon establishment and not changed thereafter. In some cases, portions of the session information may be dynamic. For example, the session manager 915 may store and maintain counters for auditing and/or to hold statistics on the session, such as bytes sent/received and transfer rates. In some embodiments, the appliance 200, such as via session manager 915, stores session information in a hash table. For example, a session cookie may be hashed or used as a key to obtain information on a session in a table.

At step 1010, the primary appliance 200 propagates information on the SSL VPN session and/or IIP addresses to the secondary appliance 200'. The primary appliance 200 may transmit or communicate via the failover connection 930 to the secondary appliance 200' to provide any information on the SSL VPN session, IIP address used for the session and/or IIP addresses of the user. The primary appliance 200 may communicate, marshal or otherwise transfer the data from the one or more objects, data structures or files to store and/or maintain the session and/or IIP address information.

The primary appliance 200 may propagate the SSL VPN and/or IIP address information at any time upon establishment of the session or any time thereafter. In one embodiment, the primary appliance 200 propagates the SSL VPN and/or IIP address information in an synchronous manner. For example, upon establishment of the SSL VPN session by the primary appliance, the appliance 200 propagates the information to the secondary appliance 200'. In one embodiment, the primary appliance 200 propagates the information to the secondary appliance after the receipt of the configuration command, e.g., /cfg command, from the client agent requesting establishment of the SSL VPN session. In other embodiments, the primary appliance 200 propagates the SSL VPN and/or IIP address information in a asynchronous manner. For example, the primary appliance 200 may propagate the information based on a timeout loop.

The primary appliance 200 may propagate SSL VPN and/or IIP address information for each session, asynchronously or synchronously. In some cases, the primary appliance 200 propagates SSL VPN and/or IIP address information for multiple sessions. In one embodiment, the propagation of multiple sessions and/or IIP address information may occur subsequently to each other. In other embodiments, the propagation of multiple session and/or IIP address information may transmitted concurrently via one or more connections 930. In one case, the propagation of multiple session and/or IIP address information is multiplexed over a single connection 930.

The primary appliance 200 may propagate any static session and/or IIP address information once upon or after establishment of the SSL VPN session and/or user assigned IIP address. The primary appliance 200 may propagate any dynamically changed session and/or IIP address information upon any changes to the session or IIP address information. In another case, the primary appliance 200 may propagate any dynamically changed session and/or IIP address information upon a predetermined frequency or configured events.

Upon receipt of any propagated information from the primary appliance 200, the secondary appliance 200' may store the propagated information in any type and form of objects, data structures, tables and/or files. The session manager 915 may establish the SSL VPN session on the secondary appliance 200. The session manager 915 may identify the session as not active. For example, the session manager 915 may put the backup or failover session on hold. The session manager 915 may also establish one or more IIP addresses for a user based on the propagated information. The session manager 915 may maintain the states of the IIP addresses based on the activity of the primary or secondary appliance and session of the user. For example, the session manager 915 may identify the propagated IIP address as on hold. In another example, the appliance 200' marks or identifies all the secondary IIP addresses on hold or inactive. In one embodiment, the session manager 915 activates an SSL VPN session and/or IIP address of a user based on detection of a failover condition from the failover detector.

At step 1015, the primary appliance 200 is detected in a state or condition to cause failover. The failover detector 920 may detect a failover condition of the primary appliance 200'. The failover detector 920 may monitor the state or condition of the primary appliance 200 on a predetermined frequency. In other cases, the failover detector 920 mat monitor the state or condition of the primary appliance 200 based on predetermined events. In one embodiment, the client agent 120 informs the failover detector 920 and/or secondary appliance 200' of the state or condition of the appliance 200. In another embodiment, the primary appliance 200, such as via a first failover detector, informs a second failover detector 920 and/or secondary appliance 200' of the state or condition of the appliance 200.

The failover condition of the primary appliance 200 may be for one or more SSL VPN sessions or for all sessions. In one embodiment, the primary appliance 200 may be in a failover state or condition with respect to a first SSL VPN session. In another embodiment, the primary appliance 200 may remain active and/or operations for a second SSL VPN session. For example, a first VIP server 275 of the primary appliance 200 may go down while a second VIP server 275 remains active. As such, the secondary appliance 200 may provide backup or failover to all the sessions of the primary appliance or a portion of the sessions. In other embodiments, a second backup appliance 200" may provide failover services to another portion of the sessions of the primary appliance 200.

Upon detection of the failover condition, the secondary appliance 200 may change a state of any of the backup or failover sessions. For example, the session manger 415 may activate one or more sessions, such as a session propagated from the primary appliance 200. The secondary appliance 200 may change the state of any IIP addresses. For example, the session manager 915 may activate one or more IIP addresses. In some embodiments, the secondary appliance 200' changes the state of any session and/or IIP address upon request to establish a session via the secondary appliance 200'.

The appliance 200, 200' may use any type and form of address resolution protocol (ARP) to resolve any IIP addresses. In one embodiment, the appliance 200, 200' uses a gratuitous ARP to resolve IIP addresses used by appliances. The appliance may transmit an ARP or gratuitous ARP request on a predetermined time period or frequency. The appliance may transmit an ARP or gratuitous ARP request based on a detection event of the failover detector 920. In some embodiments, the appliance transmit san ARP or gratuitous ARP request based any type and form of scheduling algorithm such as a staggered yield CPU algorithm. Based on the results of the ARP requests, the appliance may activate one or more IIP addresses.

At step 1020, the client establishes or obtains SSL VPN session connectivity via the secondary appliance 200'. In one embodiment, the client agent 120 detects or otherwise determines the primary appliance 200 is not operational or otherwise no longer servicing or providing the session. The client 120 is configured and constructed to transmit a request to the secondary appliance 200' to establish or re-establish the session. In some embodiments, the client agent re-establishes the connection and/or session using a host name or an IP address of the primary appliance. With the failover detected, the secondary appliance 200' may listen and respond to the IP address or host name. In another embodiment, the failover detector 920 or secondary appliance 200' informs the client agent 120 to use the secondary appliance 200' to continue or re-establish the session with the secondary appliance 200'. In yet another embodiment, the client and/or client agent continues to use the session after failover. The secondary appliance 200' seamlessly and/or transparently continues to provide or resume the session.

At step 1025, the secondary appliance 200' assigns to the user for the SSL VPN session an IIP address assigned to the user, such as the IIP address assigned during the SSL VPN session provided by the primary appliance 200. The appliance 200' provides IIP "stickiness" for the user during the failover as the session is provided by the backup or secondary appliance 200'. The appliance 200' may use any of the systems and methods described in conjunction FIGS. 4 and 5 to assign or designate IIP addresses to a user or client based on the propagated IIP address information received from the primary appliance 200.

In some cases, the secondary appliance may assign to the user or client a most recently used IIP address. In another cases, the secondary appliance may assign to the user or client a least recently used IIP address. In some embodiments, the secondary appliance assigns to the user or client the most used or one of the most used IIP addresses of the user or client. In some embodiments, the secondary appliance determines the propagated IIP address to assign to the user or client responsive to one or more policies of a policy engine. The secondary appliance may choose an inactive IIP address and make the IIP address active for assigning to the user or client. The second appliance may responsive to a policy specify a domain name suffix to append to an identifier of the user to provide a user domain name for the IIP address.

Referring now to FIG. 10B, an embodiment of example IIP propagation scenarios during session failover are depicted. In some cases, the "stickiness" of IIP addresses of a user may become out of sync due to SSL VPN session deletion propagation failure. For example, the IIP address "stickiness" may not be maintained in the primary appliances but exists in the secondary appliance. The appliance 200 includes a restoration mechanism 945 to restore the appropriate IIP address stickiness in such situations.

In view of Example 1 of FIG. 10B, the system may include two authenticated, authorized and audited users u1 and u2. These users may be associated or bound to a group "g". Group g may have one IIP address bound or associated with it. Initially, the users u1 and u2 may not have an IIP address bound to the user. In following the transaction of the Example 1 diagram, the user u1 at T1 may establish a SSL VPN session with the primary and be assigned the IIP address of the group. Using the techniques described herein, the SSL VPN session and IIP address is propagated at T1 from the primary appliance to the secondary appliance. The user may logout, disconnect or otherwise terminate the session in the primary appliance 200. The primary appliance 200 may delete the session also at T2. The propagation of the deleted session may fail at T2 leaving the secondary appliance 200' having the propagated first session of the user and associated IIP address. At this point, the secondary and primary appliances are out of synch with respect to the SSL VPN session and/or the IIP address. At T3, the user logins into the primary appliance and gets the same IIP address, and the session and IIP address information is propagated to the secondary appliance.

In view of the above example and in one embodiment, the restorer 945 determines the out of sync states of the session and/or IIP address between the secondary and primary appliance. The restorer 945 may deleted the earlier session propagated at T1 and restore the appropriate stickiness. For example, the restore 945 may delete the IIP address from the secondary appliance. In another example, the restorer 945 may change the state of the IIP address from active to inactive or some other non active state designator.

In another Example of Example 2 depicted in FIG. 10B, the user u1 establishes, at T1, a session with the primary appliance 200 and is assigned a IIP address. At T1, the primary appliance 200 propagates the session and IIP address information to the secondary appliance 200'. At T2, the user u1 may log out. The propagation from the primary appliance to secondary appliance may fail. For example, the session of user u1 which was terminated may be deleted by the primary appliance. At T3, the user u2 may establish or re-establish a session with the primary appliance and reclaim or be assigned the IIP address. The primary appliance may propagate to the secondary appliance information on this session of u2 and the assigned IIP address to u2. In one embodiment, the user u2 may already be assigned the IIP address via the secondary. This may create an IIP address conflict.

In view of this second example, the secondary appliance and/or restorer 945 may determine if the propagated IIP address is active in the secondary appliance. If the IIP address is active, then either the session of u2 on the primary appliance or the session of u2 on the secondary appliance may be deleted or otherwise deactivated. Then the appliance having the remaining session may reclaim and continue to use the IIP I. End Point Reauthorization Upon Failover Referring now to FIG. 11, an embodiment of steps of a method for performing end point authorization or re-authorization during appliance failover of an SSL VPN session is depicted. Using the techniques discussed herein, the secondary appliance 200' performs end point re-authorization on the client upon failover although the client may have been authorized via the primary appliance 200. In view of the systems and methods described herein in conjunction with FIGS. 6A-6C, 7 and 8, the appliance 200 may use client security strings to perform end point authorization. Via the values of one or more client security strings, the appliance determines if the client has attributes that meet a predetermined policy for authorization. Depending on the values returned by the client via client agent 120, the appliance 200 determined whether or not to authorize the client to connect and establish an SSL VPN session via the appliance.

As part of the session data and information, the appliance 200 such as via session manager may store, maintain or track the values of the client security strings used to perform end point detection and authorization. In some embodiments, these client security string values or end point authorization values are not propagated from the primary appliance to the secondary appliance. In other embodiments, any client security string values propagated to a secondary appliance may become out of sync or stale. In other cases, the values for the client security strings would change if re-obtained or detected from the client. For example, one or more attributes or characteristics of the client may have changed between the client's establishment of the session with the appliance and the failover. The client may go through one or more software upgrades or de-installs between SSL VPN session login and the occurrence of a failover. The attributes of the client 102 may be such that the values of the client security string may not allow the client to be authorized in accordance with policy.

Figure 11:
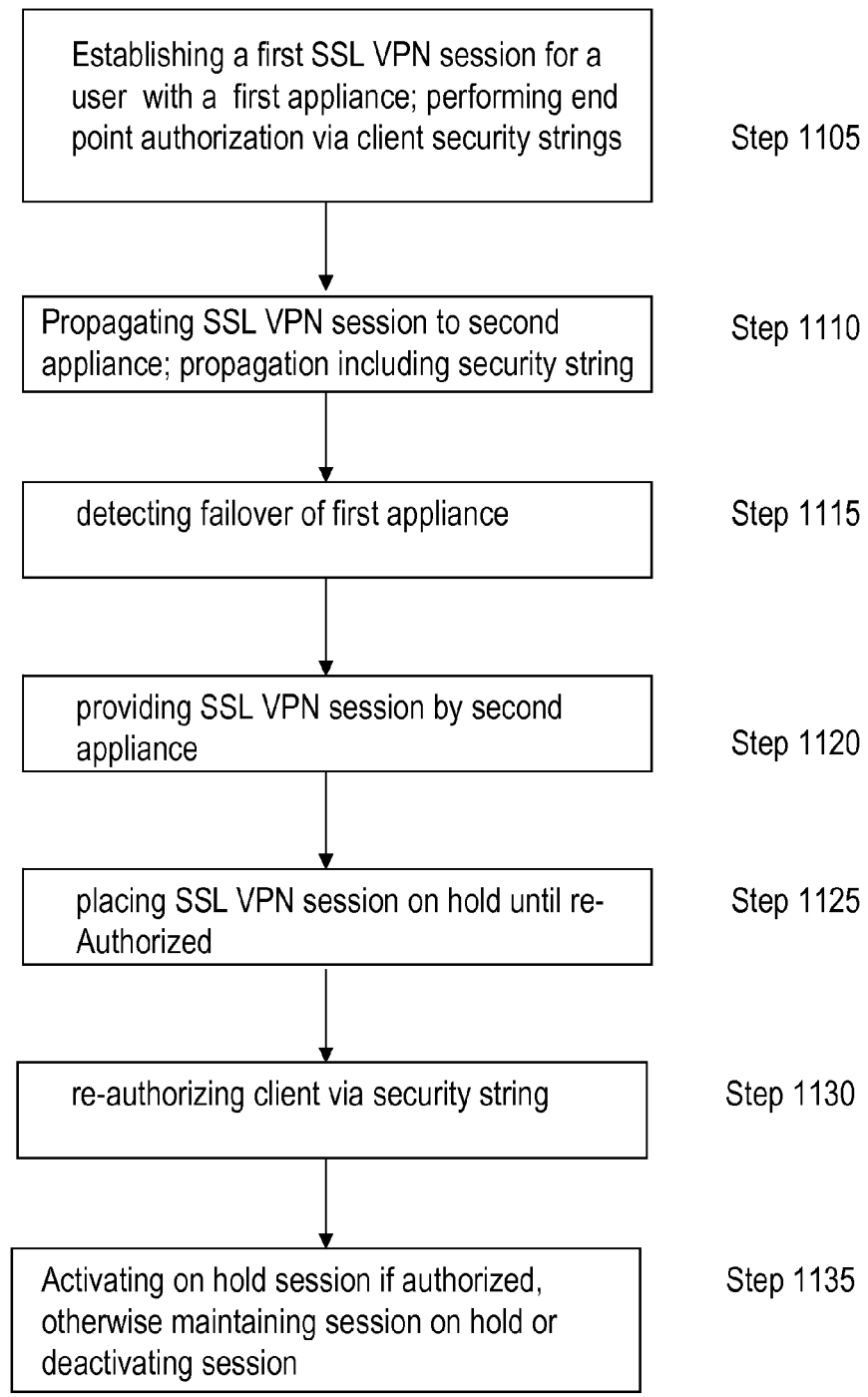
FIG. 11 is a flow diagram depicting steps of an embodiment for performing end point authorization upon failover.

The embodiment of steps of method 1100 in FIG. 11 depict a technique for end point detection and authorization to address the issue with security during failover based on possible or actual changes to client attributes that may impact client security strings applied to the transferred session. In brief overview of method 1100, at step 1105, the primary performs end point authorization using client security strings and establishes an SSL VPN session with a user. The user may be assigned an IIP address. At step 1110, the primary appliance 200 propagates the SSL VPN session information, including client security string expressions to the secondary appliance 200'. At step 1115, a failover condition of the primary appliance 200 is detected. At step 1120, the secondary appliance 200' provides SSL VPN session to the client based on propagated session information. At step 1125, the secondary appliance places the transferred or failover SSL VPN session on hold until end point detection and authorization is performed on the client. At step 1130, the secondary appliance 200' transmits the propagated client security string(s) to the client. The client returns values for the client security strings. The secondary appliance determines whether or not to authorized the client for access to the network or server via the SSL VPN session. At step 1135, if the client is authorized the secondary appliance activates the SSL VPN session. Otherwise, the secondary appliance maintains the session on hold, deactivates or otherwise deletes the session.

In further details, at step 1105, an application or a user on the client 102 may request a SSL VPN connection from a first network 104 to a second network 104' such as to a server 106 on network 104. As discussed above in connection with step 1005 of FIG. 10A, the client agent 120 may establish a connection with the primary appliance 200. The client agent 120 may transmit a request to establish an SSL VPN session to a server or the network via the appliance 200. The appliance 200 may associate, inherit or otherwise apply one or more policies to the session or connection request from the client, such as any type and form of end point authorization policy. In response to the request, the appliance 200 in accordance with policy may perform any type and form of end point detection and authorization. In some embodiments, the appliance 200 performs any of the end point detection and authorization techniques using client security strings described above in connection with FIGS. 6A-6C, 7 and 8.

Using the client security string techniques described herein, the appliance 200 based on policy transmits a client security string for evaluation to the client agent 120. For example, a client security string may in one embodiment be expressed in the form of:

```
client.application[mcafeevirusscan].version >= 4.88 &&
client.svc[svchost]RUNNING
```

The client agent 120 evaluates the one or more client security strings and transmits values for the strings to the appliance 200. Based on the policy configuration, the appliance 200 determines whether or not the client is authorized to establish the SSL VPN session. If the client is authorized, the appliance 200 establishes and allows the SSL VPN session to be used by the client 102. Otherwise, the appliance 200 may deny or drop the client's request for access via an SSL VPN session.

The appliance 200, such as via session manager 915, may store and maintain information on the established SSL VPN session, including any IIP address information, in one or more objects, data structures tables and/or files. The appliance 200 may store and maintain information on the client security strings applied to the established SSL VPN session and any values thereof. In some embodiments, the appliance 200 tracks the client security strings used for the session via any pointing or indexing to the applicable policies of the policy engine 236.

At step 1110, the primary appliance 200 propagates information on the SSL VPN session and/or client security strings to the secondary appliance 200'. The primary appliance 200 may transmit or communicate via the failover connection 930 to the secondary appliance 200' to provide any information on the SSL VPN session, IIP addresses associated with the session and/or the client security strings applied or used for the session. The primary appliance 200 may communicate or transfer the data from the one or more objects, data structures or files to store and/or maintain the session and/or IIP address information.

The primary appliance 200 may propagate the SSL VPN and/or client security string information at any time upon establishment of the session or any time thereafter. In one embodiment, the primary appliance 200 propagates the SSL VPN and/or client security string information in an asynchronous manner. For example, upon establishment of the SSL VPN session by the primary appliance, the appliance 200 propagates the information to the secondary appliance 200'. In one embodiment, the primary appliance 200 propagates the information to the secondary appliance after the receipt of the configuration command, e.g., /cfg command, from the client agent requesting establishment of the SSL VPN session. In other embodiments, the primary appliance 200 propagates the SSL VPN and/or or client security string information in an asynchronous manner. For example, the primary appliance 200 may propagate the information based on a timeout loop.

The primary appliance 200 may propagate SSL VPN and/or IIP address information for each session, asynchronously or synchronously. In some cases, the primary appliance 200 propagates SSL VPN and/or or client security string information for multiple sessions. In one embodiment, the propagation of multiple sessions and/or IIP address information may occur subsequently to each other. In other embodiments, the propagation of multiple session and/or or client security string information may transmitted concurrently via one or more connections 930. In one case, the propagation of multiple session and/or IIP address information is multiplexed over a single connection 930.

The primary appliance 200 may propagate any policies including the client security strings to the secondary appliance. The primary appliance 200 may propagate the policies to the secondary appliance upon appliance startup, policy configuration or binding of the policy to a user, session or other entity. In another case, the primary appliance 200 may propagate any changed client security string information upon a predetermined frequency or configured events.

Upon receipt of any propagated information from the primary appliance 200, the secondary appliance 200' may store the propagated information in any type and form of objects, data structures, tables and/or files. The session manager 915 may establish the SSL VPN session on the secondary appliance 200. The session manager 915 may identify the session as not active. For example, the session manager 915 may put the backup or failover session on hold. The session manager 915 may also associate the propagated client string information for the session based on the propagated information. In another embodiment, the secondary appliance 200' inherits or associates the client security strings from one or more policies of the policy engine 236 of the secondary appliance 200' associated or bound to the session.

At step 1115, the primary appliance 200 is detected in a state or condition to cause failover and at step 1120, the second appliance provides SSL VPN session connectivity for the client. As described in conjunction with FIG. 10A and steps 1015 and 1020, the secondary appliance uses the propagated information to re-establish an SSL VPN session for the client 102. For example, the client agent 120 establishes the SSL VPN session with the secondary appliance instead of the failed primary appliance. The secondary appliance claims the transferred SSL VPN session and continues the SSL VPN session for the client. In one embodiment, the user requests to establish the SSL VPN session via another client.

At step 1125, the secondary appliance places or identifies the transferred, propagated or established SSL VPN session as on hold or otherwise not active or available for use. The secondary appliance 200' may determine that the session has one or more end point authorization policies or client security strings associated with the session. In one embodiment, the secondary appliance 200' determines the failed appliance 200 propagated client security information for the session. In some embodiments, the secondary appliance 200' determines to place the session on hold responsive to a policy. In yet another embodiment, the secondary appliance 200' determines to place the session on hold based on the type of client security string. In other embodiments, the secondary appliance 200' determines to place the session on hold based on the value of the client security string detected via the primary appliance and propagated to the secondary appliance. In one embodiment, the secondary appliance 200' automatically places the SSL VPN session on hold until the client is re-authorized.

At step 1130, the secondary appliance performs end point detection and authorization on the client for the transferred SSL VPN session. In one embodiment, the secondary appliance transmits the propagated client security string(s) to the client agent 120 for evaluation. In some embodiment, the secondary appliance transmits to the client agent one client security string from a plurality of propagated client security strings. In some cases, the secondary appliance determines which of the propagated client security strings to obtain updated values or to verify the values from the client upon failover. In one case, the secondary appliance may determine that is not required or desired to check the value of a client security string after failover. For example, the secondary appliance may determine the value of the client security string may not have changed or is not likely to have changes.

In another embodiment, the secondary appliance transmits the client security string from any inherited policies or polices bound to the user or session. In some embodiments, the secondary appliance transmits additional client security string in conjunction with the propagated client security strings. In one embodiment, the secondary appliance modifies one or more propagated client security strings, or any portions thereof, by policy or otherwise. In one embodiment, the secondary appliance combines the propagated client security strings with one or more client security strings imposed on the session by the secondary appliance via policy or otherwise.

Further to step 1130, the secondary appliance receives from the client agent 120 an evaluation of the one or more transmitted client security strings. The secondary appliance checks, validates or otherwise compares these values to acceptable values indicated by one or more policies of the policy engine. The comparison to values specified via policy determines whether or not the client is authorized for access. The values of the client attributes determined via evaluation of the client security string may or may not be acceptable in accordance with policy. In another embodiment, the result of evaluation of the client security string or series of client security strings determines whether or not the client is authorized for access. In some embodiments, the secondary appliance 200 performs evaluation of at least a portion of the expression of a plurality of client security strings to determine authorization of the client.

At step 1135, the secondary appliance 200 determines to activate or not activate the transferred SSL VPN session based on the results of end point detection and authorization of the client. If after appliance failover, the client is re-authorized in accordance with policy, such as via client security strings, the secondary appliance activates the SSL VPN session put on hold. In one embodiment, the session manager 915 responsive to the policy engine and end point authorization changes the state of the SSL VPN session to active. In another embodiment, the secondary appliance re-authenticates the user in addition to authorizing the client. The secondary appliance may activate the SSL VPN session based on re-authentication of the user and re-authorization of the client.

If after appliance failover, the client is not re-authorized in accordance with policy, such as failing to provide acceptable values for the client security strings, the secondary appliance does not activate the SSL VPN session placed on hold. In one embodiment, the secondary appliance, such as via session manager 915, maintains the SSL VPN session on hold. In another embodiment, the secondary appliance, such as via session manager 915, changes the state of the SSL VPN session to invalid, inactive or not authorized. In some embodiments, the secondary appliance, such as via session manager 915, deletes the SSL VPN session. In another embodiment, the secondary appliance de-establishes the SSL VPN session. In one embodiment, the secondary appliance drops or disconnects the connection with the client responsive to the client failing end point authorization. In some embodiments, the secondary appliance activates the session but limits the user's access based on the results of the end point detection, such as by placing the user in a quarantined access group.

In view of the structure, functions and operations during failover as described in FIGS. 9-11, the appliance may perform any of the steps of method 1000 and method 1100 in any combination. As such, in some embodiments, the appliance may provide both IIP address "stickiness" for users during failover as well as end point re-authorization. In this manner, the systems and method of the appliance described herein provide a seamless and/or transparent failover solution that provides continued and/or additional security measures.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed:

1. A method of maintaining a user's intranet internet protocol address upon failover of a client's secure socket layer virtual private network (SSL VPN) session from a first appliance to a second appliance, the method comprising the steps of:
   (a) receiving, by a second appliance, information from a first appliance, the information identifying one or more intranet internet protocol addresses assigned to a first user for accessing a network via a first secure socket layer virtual private network (SSL VPN) session provided by the first appliance, each of the one or more intranet internet protocol addresses of the first user is independent from an internet protocol address assigned to a device operated by the first user;
   (b) detecting, by the second appliance, that the first appliance is unavailable to provide the first SSL VPN session to the network, and providing, by the second appliance, SSL VPN connectivity to the network in response to the detection;
   (c) receiving, by the second appliance, a request from the client operated by the first user to establish a second SSL VPN session with the network; and
   (d) assigning, by the second appliance, to the first user a first intranet internet protocol address previously assigned to the first user from the one or more intranet internet protocol addresses as an internet protocol address on the network.

2. The method of claim 1, wherein step (d) comprises assigning, by the second appliance, one of a least recently or a most recently used intranet internet protocol address of the one or more intranet internet protocol addresses as the first intranet internet protocol address.

3. The method of claim 1, wherein step (d) comprises assigning, by the second appliance, one of a least used or a most used intranet internet protocol address of the one or more intranet internet protocol addresses as the first intranet internet protocol address.

4. The method of claim 1, wherein step (d) comprises assigning, by the second appliance, the first intranet internet protocol address from the one or more intranet internet protocol addresses responsive to a policy of a policy engine.

5. The method of claim 1, wherein step (d) comprises determining, by the second appliance, an inactive intranet internet protocol address from the plurality of multiple intranet internet protocol addresses as the first intranet internet protocol address.

6. The method of claim 1, comprising identifying, by the second appliance, a policy specifying a domain name suffix to append to an identifier of the user to provide a user domain name.

7. The method of claim 6, comprising associating, by the second appliance, the user domain name with the first intranet internet protocol address.

8. The method of claim 1, wherein step (c) comprises receiving, by the second appliance, one or more client-side attributes of the client.

9. The method of claim 8, comprising assigning, by the second appliance, the client to an authorization group based on the one or more client-side attributes.

10. The method of claim 1, wherein step (c) comprises transmitting, by the second appliance, a request to the client to evaluate at least one clause of the security string, the at least one clause including an expression associated with a client-side attribute.

11. The method of claim 10, comprising receiving, by the second appliance, a result of the client's evaluation of the at least one clause, and assigning, by the second appliance, the client to an authorization group based on the result.

12. A system for maintaining a user's intranet internet protocol address upon failover of a client's secure socket layer virtual private network (SSL VPN) session from a first appliance to a second appliance, the system comprising the steps of:
   means for receiving by a second appliance information from a first appliance, the information identifying one or more intranet internet protocol addresses assigned to a first user for accessing a network via a first secure socket layer virtual private network (SSL VPN) session provided by the first appliance, each of the one or more intranet internet protocol addresses of the first user is independent from an internet protocol address assigned to a device operated by the first user;
   means for detecting by the second appliance that the first appliance is unavailable to provide the first SSL VPN session to the network, wherein the second appliance provides SSL VPN connectivity to the network in response to the detection;
   means for receiving by the second appliance a request from the client operated by the first user to establish a second SSL VPN session with the network; and
   means for assigning by the second appliance to the first user a first intranet internet protocol address previously assigned to the first user from the one or more intranet internet protocol addresses as an internet protocol address on the network.

13. The system of claim 12, wherein the second appliance assigns one of a least recently or a most recently used intranet internet protocol address of the one or more intranet internet protocol addresses as the first intranet internet protocol address.

14. The system of claim 12, wherein the second appliance assigns one of a least used or a most used intranet internet protocol address of the one or more intranet internet protocol addresses as the first intranet internet protocol address.

15. The system of claim 12, wherein the second appliance assigns the first intranet internet protocol address from the one or more intranet internet protocol addresses responsive to a policy of a policy engine.

16. The system of claim 12, wherein the second appliance determines an inactive intranet internet protocol address from the plurality of multiple intranet internet protocol addresses as the first intranet internet protocol address.

17. The system of claim 12, wherein the second appliance identifies a policy specifying a domain name suffix to append to an identifier of the user to provide a user domain name.

18. The system of claim 17, wherein the second appliance associates the user domain name with the first intranet internet protocol address.

19. The system of claim 12, wherein the second appliance receives one or more client-side attributes of the client.

20. The system of claim 19, wherein the second appliance assigns the client to an authorization group based on the one or more client-side attributes.

21. The system of claim 12, wherein the second appliance transmits a request to the client to evaluate at least one clause of the security string, the at least one clause including an expression associated with a client-side attribute.

22. The system of claim 12, wherein the second appliance receives a result of the client's evaluation of the at least one clause, and assigns the client to an authorization group based on the result.

* * * * *